US006965635B2

(12) United States Patent
Kido

(10) Patent No.: US 6,965,635 B2
(45) Date of Patent: Nov. 15, 2005

(54) MATCHED FILTER AND METHOD FOR DETERMINING CORRELATION

(75) Inventor: Naoshige Kido, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 738 days.

(21) Appl. No.: 09/926,644

(22) PCT Filed: May 29, 2001

(86) PCT No.: PCT/JP01/02637

§ 371 (c)(1),
(2), (4) Date: Nov. 28, 2001

(87) PCT Pub. No.: WO01/76115

PCT Pub. Date: Oct. 20, 2001

(65) Prior Publication Data

US 2002/0136280 A1 Sep. 26, 2002

(30) Foreign Application Priority Data

Mar. 31, 2000 (JP) .............................. 2000-099306

(51) Int. Cl.[7] .............................................. H04B 1/69
(52) U.S. Cl. ...................... 375/152; 375/136; 375/143; 375/150; 370/320; 370/335
(58) Field of Search ............................. 375/152, 130, 375/136, 140, 143, 147, 150; 370/320, 335, 370/342, 441

(56) References Cited

U.S. PATENT DOCUMENTS

| 5,648,983 | A | * | 7/1997 | Kostic et al. ............... 375/150 |
| 5,903,595 | A | | 5/1999 | Suzuki ....................... 375/152 |
| 6,788,669 | B1 | * | 9/2004 | Takano et al. .............. 370/342 |
| 6,788,736 | B1 | * | 9/2004 | Kawama et al. ............ 375/152 |
| 6,842,480 | B1 | * | 1/2005 | Yang et al. ................. 375/152 |

FOREIGN PATENT DOCUMENTS

| EP | 0932262 | 7/1999 |
| JP | 7058669 | 3/1995 |
| JP | 10173485 | 6/1998 |
| JP | 10285079 | 10/1998 |
| JP | 11196067 | 7/1999 |
| JP | 11274977 | 10/1999 |
| JP | 2000-244456 | 9/2000 |

* cited by examiner

Primary Examiner—Shuwang Liu
(74) Attorney, Agent, or Firm—Greenblum & Bernstein, P.L.C.

(57) ABSTRACT

The present invention relates to a correlation detection method using a matched filter. The correlation detection method of the present invention carries out a type of despreading calculation of fixing reception data and scanning spreading codes. The correlation detection method of the present invention then integrates the despreading result on the first-half symbol segment located before a symbol delimiter uniquely determined according to the amount of phase shift of spreading codes and the last-half symbol segment located after the symbol delimiter, adds the integration result with respect to the first-half symbol segment to the integration result corresponding to the amount of the same phase shift of the spreading code with respect to the same symbol stored as a result of the same processing as the pervious processing, and temporarily stores the integration result with respect to the last-half symbol segment and adds the stored integration result to the integration result corresponding to the amount of the same phase shift of the spreading codes on the same symbol obtained as a result of carrying out the next same processing and thereby detects a symbol-unit correlation.

14 Claims, 22 Drawing Sheets

MATCHED FILTER AND METHOD FOR DETERMINING CORRELATION

This application is an application under 35 USC §371 of PCT International application No. PCT/JP01/02637 which has an international filing date of May 29, 2001, which claims priority on Japanese Application No. 2000-099506 filed Mar. 31, 2000.

TECHNICAL FIELD

The present invention relates to a matched filter used for synchronization establishment processing in a spread spectrum communication system and a correlation detection method using the matched filter.

BACKGROUND ART

In mobile communications, a spread spectrum communication with high frequency utilization efficiency capable of high-speed and high quality data communication, a CDMA (Code Division Multiple Access) system in particular, is becoming mainstream in recent years.

An area covered by one base station is called a "cell". If it is possible to increase the radius of a cell, the number of base stations can be reduced. Thus, the radius of a cell is an important factor in a mobile communication system and the radius of a cell may actually extend a few tens of km.

In the case where the radius of a cell reaches a few tens of kin, the distance from a mobile unit to a base station varies a great deal when the mobile unit is close to the base station and when the mobile unit is located. near the cell boundary. Therefore, the amount of delay of a signal received by the base station varies a great deal.

When a CDMA-based mobile communication between a mobile terminal apparatus and a base station starts, the base station needs to carry out high-speed initial synchronization processing taking into account a sufficiently large radius of a cell first.

For example, when the mobile terminal apparatus requests the base station, which is the communication target, for a communication permission, the base station learns how far the mobile terminal apparatus is located by measuring a propagation delay time relative to a reference signal.

That is, it is possible to know a rough distance to the mobile station by the base station sending a reference signal to the mobile station at a predetermined timing (reference timing) and measuring a time (this corresponding to a propagation delay time) required for an ACK (acknowledge signal) to be sent from the mobile station in response thereto. As a result, the base station can narrow the search range of correlation detection to a certain degree when detecting an acknowledge signal from the mobile station in response to the signal sent from the base station.

The propagation delay time is calculated with reference to delay profile information obtained by a matched filter circuit.

When creating a delay profile, the matched filter carries out a so-called data scan/code fixed despreading calculation. That is, a spreading code necessary for a despreading calculation of a target symbol is set (code-fixed) in the matched filter and a correlation value is calculated by inputting reception data continuously over a search segment which is determined with a propagation delay time taken into account.

FIG. 21 shows a configuration of a conventional matched filter.

Spreading codes generated by code generator 106 are stored in code register 107. Code register 107 consists of 256 shift registers 104b.

Then, reception data is input serially to shift register 105. Every time 1-chip reception data is input, despreading calculation section 109 multiplies the parallel outputs of shift register 105 by the outputs of code register 107. Despreading calculation section 109 consists of 256 multiplication circuits 108.

Then, integrating calculation segment 103 (provided with integration circuit 110) integrates the parallel outputs of despreading calculation section 109 and calculates a correlation value corresponding to 1-symbol data.

Suppose the search range (width of delay time) is 0 to 255 chips (equivalent to 1 symbol). Since the above calculation is carried out every time data is shifted by one chip, 256 calculations in total are required.

Since the matched filter detects a correlation on a symbol-by-symbol basis, one matched filter can process only a reception signal with a 1-symbol propagation delay.

Here, because of a large radius of a cell, if the search range (width of delay time) extends from 0 to 511 chips (equivalent to 2 symbols), one matched filter is not enough, and therefore two matched filters 9004 and 906 are used as shown in FIG. 22A.

The two matched filters 904 and 906 in FIG. 22A operate at reference timings which are different from each other and both matched filters output a delay profile equivalent to one symbol.

FIG. 22B is a timing chart to illustrate operations of the two matched filters.

As shown in the figure, matched filter 904 operates at a first reference timing and matched filter 906 operates at a second reference timing with a delay time equivalent to one symbol.

An operation of each matched filter will be explained taking processing of the first symbol as an example.

At time T1, a first symbol spreading code is set in matched filter 904 and a correlation calculation on the first symbol is performed while shifting the input data one chip at a time. A search from chip 0 to chip 255 (first-half search) finishes at time T2.

Then, at time T2 (second reference timing), a first symbol spreading code is set in matched filter 906 and a correlation calculation on the first symbol is performed while shifting the input data one chip at a time until time T3. A search from chip 256 to chip 511 (last-half search) finishes at time T3.

At time T2, a second symbol detection code is set in matched filter 904 and a search on the second symbol starts.

By combining the search results from chip 0 to chip 255 and the search results from chip 256 to chip 511 on the first symbol calculated in this way together, it is possible to obtain a delay profile with a time equivalent to two symbols with respect to the first symbol.

However, the use of a plurality of matched filters will increase the scale of the circuit and extremely increase power consumption as well. That is, as the area occupied by the LSI chip increases, both costs and current consumption increase accordingly.

In reality, however, the radius of a cell (coverage) tends to necessarily be increased, which also causes propagation delays to increase, and covering those propagation delays needs to further increase the number of matched filters.

Moreover, mobile terminal apparatuses and base stations actually use a plurality of matched filters to generate and calculate delay profiles under various conditions. In this case, an increase of the scale of the circuit and increase of cost and power consumption constitute problems, too.

As shown above, since conventional matched filters have low processing performance, it is difficult to meet current demands by correlation detection using those matched filters.

It is an object of the present invention to improve by far the efficiency (processing speed) of correlation detection processing using matched filters and thereby suppress increases of the scale of the circuit and solve the problems of power consumption.

That is, use of the present invention basically allows a single matched filter to even handle cases where a base station has a large radius of a cell or where mobile stations calculate delay profiles under multiple conditions.

DISCLOSURE OF INVENTION

The present invention does not perform fixed-code and data scanning type despreading calculations. Instead, the present invention performs fixed-data and code scanning type despreading calculations.

A fixed-data and code scanning type despreading calculation refers to a system to calculate correlation values by fixing reception data for a predetermined period and multiplying the fixed data by one spreading code after another according to respective propagation delays.

The reason that conventional matched filters have low processing performance of correlation calculations is that the speed (that is transfer rate of shift registers) at which reception data is input is low and this low speed constitutes constraints on the speed of the entire correlation detection processing. That is, the cause is that the processing performance of the matched filter hardware is not fully exploited.

Thus, the present invention adopts a system of fixing reception data and scanning spreading codes. This eliminates constraints on the speed caused by inputting data to the matched filters.

On the other hand, the present invention can generate spreading codes and perform arithmetic calculations such as multiplications and additions incomparably faster than data transfers by shift registers. Thus, the processing performance of hardware determines the performance of correlation detection processing. Therefore, the present invention can exploit the potential capacity of hardware to the full and thereby allows efficient correlation calculation processing unparalleled among conventional arts.

Therefore, the present invention, using a single filter, can achieve completely the same result of generating delay profiles through data scan/code-fixed type despreading calculations using a plurality of matched filters. For example, when used to establish initial synchronization of a base station, the present invention can even handle, using a single matched filter, a case where a propagation delay from a mobile station is longer than a period equivalent to one symbol.

However, when input data is fixed as in the case of the present invention, not all the one-symbol data (256-chip data) may be constructed of data that belongs to one symbol. That is, immediately preceding symbol data bit is likely to be mixed with the current symbol data bit. A correlation value is obtained by integrating despreading results with respect to one symbol, whereas integrating among partial despreading results with respect to different symbols cannot obtain any correlation value. Therefore, it is necessary to strictly distinguish an integration calculation with respect to the immediately preceding symbol from an integration calculation with respect to the current symbol and handle these calculations separately.

Therefore, the present invention always needs to change integration calculation segments according to symbol segments. That is, data obtained through one despreading process is divided into two segments in accordance with the position of a boundary between the immediately preceding symbol and the current symbol, an integration calculation is performed between the despreading results with respect to the immediately preceding symbol and an integration calculation is performed between the despreading results with respect to the current symbol. More specifically, every time a despread code is shifted by one chip, the end point (and start point) of the integration range is also shifted by one chip and the corresponding integration range is changed as appropriate.

Data obtained by each integration calculation is only a partial integration result. The integration result (partial integration result) with respect to the current symbol is temporarily stored in memory. On the other hand, the data of the integration result (partial integration result) with respect to the immediately preceding symbol is added to the data of the partial integration result stored in memory during the previous correlation calculation processing, and in this way a correlation value on the immediately preceding symbol is obtained.

Furthermore, the data of the partial integration result with respect to the current symbol stored in memory is added to the data of the partial integration result calculated in the next correlation detection processing, and a correlation value is obtained at that time.

One preferred embodiment of the calculation method of the matched filter of the present invention carries out despreading by retaining and fixing input data in a temporary storage circuit and scanning spreading codes. With regard to the despreading result data obtained, this embodiment makes a distinction between a segment before a symbol delimiter (first-half symbol segment) which is uniquely determined according to the amount of phase shift of a spreading code and a segment after the symbol delimiter (last-half symbol segment) and integrates the despreading results with respect to the respective segments. Then, with respect to the first-half symbol segment, this integration result is added to the integration result corresponding to the same amount of phase shift of the spreading code with respect to the same symbol retained as the result of the same processing as the previous processing. On the other hand, the integration result of the last-half symbol segment is temporarily stored and added to the integration result corresponding to the same amount of phase shift of the spreading code with respect to the same symbol obtained as the result of executing the next same processing, and correlations are thereby detected on a symbol-by-symbol basis. Then, a comparison is made between the detected symbol-by-symbol correlation values, a maximum correlation is detected and an actual amount of delay of the input data is thereby detected.

Another preferred embodiment of the calculation method of the matched filter of the present invention provides a temporary storage circuit that stores input data, a despreading calculation circuit that multiplies the input data temporarily stored in the storage circuit by spreading codes while scanning one chip at a time, an integration circuit that integrates despreading results with respect to a segment before a symbol delimiter (first-half symbol segment) which is uniquely determined according to the amount of phase shift of a spreading code and a segment after the symbol delimiter (last-half symbol segment), a storage circuit that temporarily stores the integration result of the last-half symbol segment, and an addition circuit that adds the integration result with respect to the first-half symbol segment to the integration result corresponding to the same amount of phase shift of a spreading code with respect to the same symbol retained in the storage circuit as a result of the same processing as the previous processing and outputs a correlation value on one symbol.

The matched filter of the present invention can be used to detect correlations of spread spectrum modulated signals received by a base station and mobile stations. The present invention can easily extend a corresponding radius of a cell of a base station system and carry out delay profile calculations under various conditions using a circuit with a by far smaller scale than conventional arts. Furthermore, by installing a correlation detection circuit that incorporates the matched filter calculation circuit of the present invention in a mobile communication system such as a base station and mobile terminal apparatuses, it is possible to implement a mobile communication system at low costs and low power consumption as a result of an improved calculation method and calculation speed.

BEST MODE FOR CARRYING OUT THE INVENTION

Before explaining specific embodiments, a basic concept of the present invention will be explained below with reference to FIG. 1 to FIG. 7.

Figure 1A:
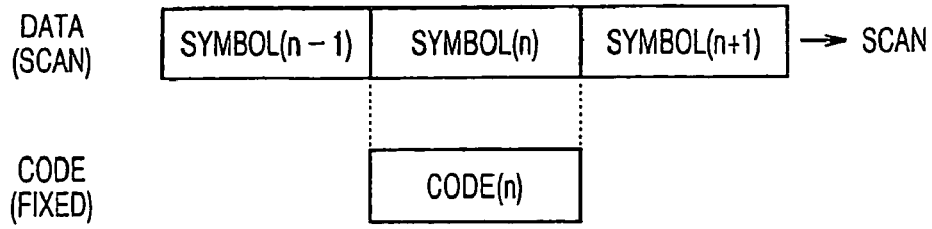
FIG. 1A illustrates a conventional code-fixed/data scan type correlation detection method.

According to the conventional system, a spreading code is fixed and data is scanned as shown in FIG. 1A. In contrast to this, the present invention adopts a system in which data is fixed and spreading codes are scanned one chip at a time as shown in FIG. 1B.

Figure 1B:
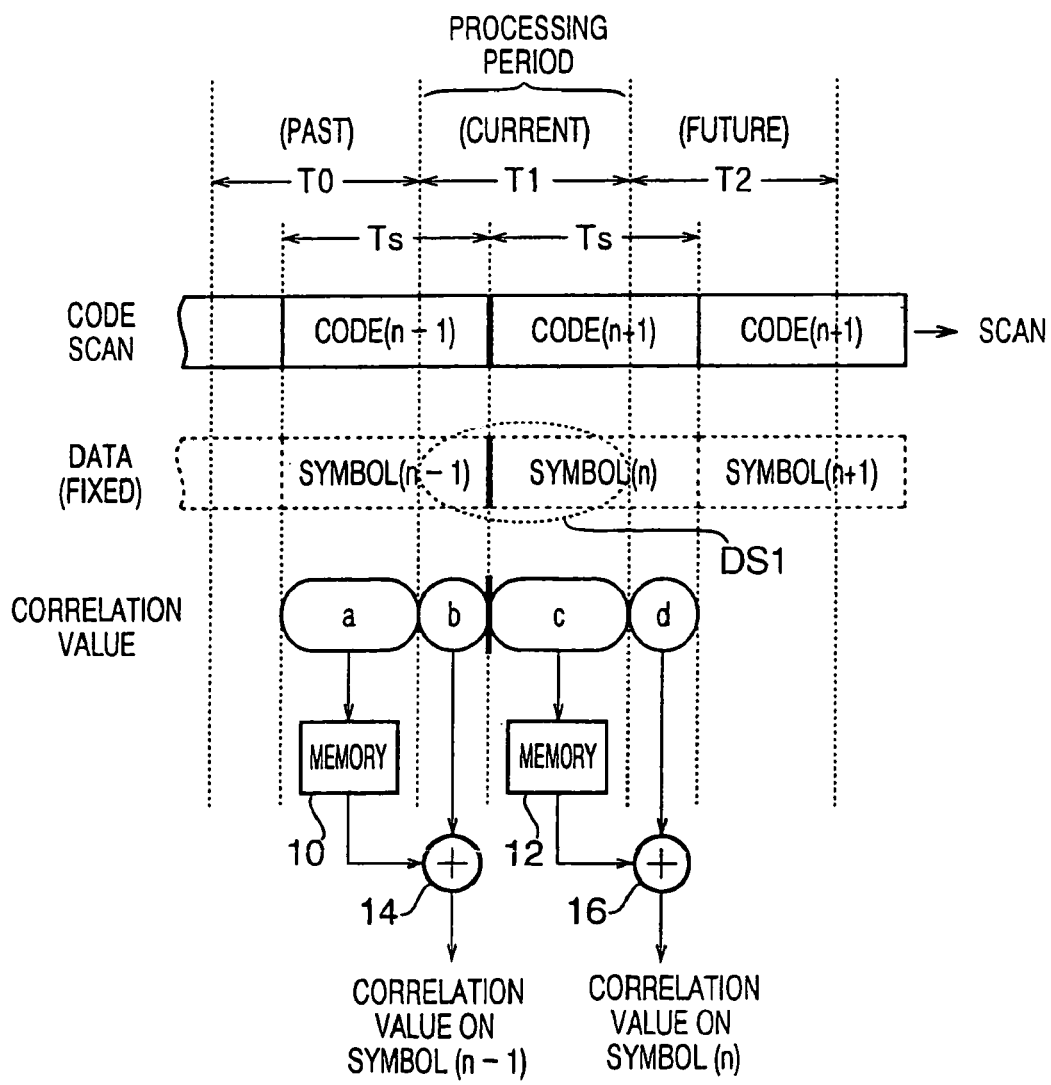
FIG. 1B illustrates features of a calculation (code scan/data-fixed system) according to a matched filter of the present invention.

As shown in FIG. 1B, input data is divided into processing periods Tn corresponding to a 1-symbol period (=Ts), latched and fixed in a shift register in this unit. In the figure, processing segment T1 corresponds to the current period, T0 corresponds to a past processing period and T2 corresponds to a future processing period.

A processing period (Tn) and symbol period (Ts) are concepts independent of each other and not synchronized. That is, the symbol period (Ts) is a period that exactly corresponds to one symbol of an actual reception signal, while the processing period (Tn) is a division to execute processing which corresponds to the length of data latched into a shift register and is determined for convenience' sake to execute processing.

Thus, for example, processing period T1 includes a mixture of part of symbol (n−1) and part of symbol (n). In FIG. 1B, the area in which this mixture of data exists is enclosed by dotted line and indicated with code DS1.

It is not known how two neighboring symbols are mixed during one processing period.

Thus, assuming all possible cases where there might be boundaries between symbols (delimiters between symbols), an integration (integration with respect to part of one symbol) is performed with symbols taken into account by shifting integration segments in the respective cases. Then, later all integration results are combined together, correlation values with respect to one entire symbol are calculated, and these correlation values are compared to find a correlation peak. The timing that gives the correlation peak is the input timing of the actual reception data.

Here, a delimiter of symbols is uniquely (automatically) determined according to a delay corresponding to a number of chips by scanning spreading codes while shifting spreading codes from an initial state (a reference timing) one chip at a time. In FIG. 1, an actual delimiter of a symbol during processing period T1 is expressed with a heavy line.

As illustrated in the figure, if this symbol delimiter is taken into account, during processing period T1, integration value (partial integration value) b of the despreading result with respect to the data that belongs to symbol (n–1) and integration value (partial integration value) c of the despreading result with respect to the data that belongs to symbol (n) are obtained.

Integration value b of the despreading result with respect to the data that belongs to symbol (n–1) is added to integration value a (this "a" is an integration value corresponding to the amount of delay of the same reception signal) of the despreading result with respect to the data that belongs to symbol (n–1) which is calculated by processing one cycle ahead and stored in memory 10.

This allows a correlation value corresponding to an amount of delay with respect to symbol (n–1) to be calculated.

Integration value c of the despreading result with respect to the data that belongs to symbol (n) is stored in memory 12.

Then, this integration value c is added to integration value d (this "d" is an integration value corresponding to the amount of delay of the same reception signal) of the despreading result with respect to the data that belongs to symbol (n) which is calculated in the next processing cycle. This allows a correlation value corresponding to an amount of delay on symbol (n) to be calculated.

In this way, a correlation value (a value estimated to be a correlation value) on one symbol is calculated for every one chip and a correlation value peak (symbol timing) on the symbol is actually detected by detecting a maximum value from among those correlation values.

Figure 2:
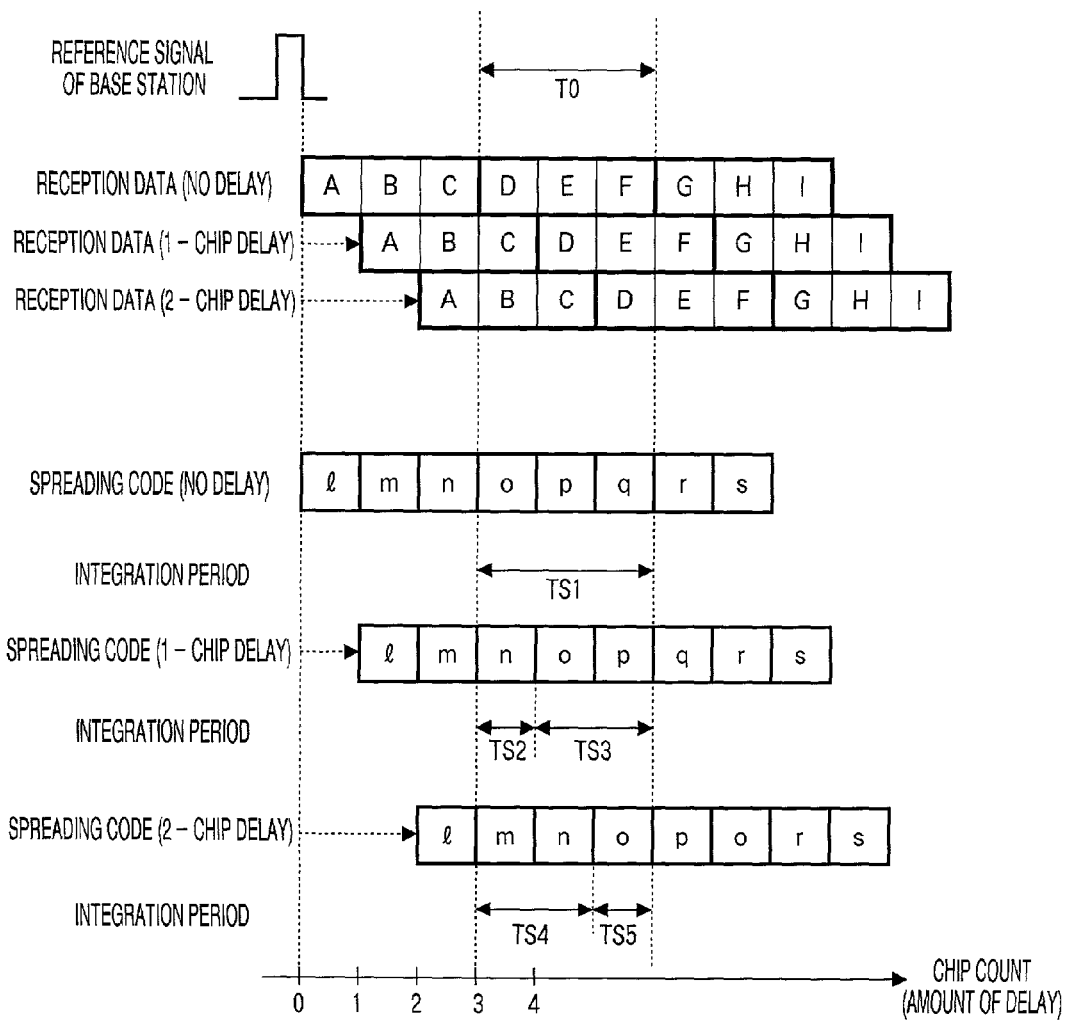
FIG. 2 illustrates a specific relationship between an amount of delay of reception data, a spreading code and integration segment in a calculation (code scan/data-fixed system) according to the matched filter of the present invention.

FIG. 2 shows a specific example. Suppose a case where there is no delay of reception data (A to I) with respect to a reference signal of a base station, a case where there is a one-chip delay and a case where there is a two-chip delay. In all cases, data is latched into a shift register segmented by processing period (current processing period) T0.

If there is no delay, data to be latched is "D, E and F" and in this case, the processing period and the symbol segment (symbol period) match. on the other hand, in the case of the 1-chip delay, data to be latched is "C, D and E" and the symbol delimiter is located between data C and data D.

On the other hand, in the case of the 2-chip delay, data to be latched is "B, C and D" and the symbol delimiter is located between data C and data D.

The latched data (one of DEF, CDE or BCD) is multiplied by a spreading code (despreading code) while shifting the spreading code one chip at a time.

First, a spreading code that corresponds to the case of no delay is multiplied. The spreading code in this case is "o, p, q". The segment over which the results of multiplying the reception data elements by these spreading code chips are integrated is TS1 (which matches the processing period).

The next code to be multiplied is "n, o, p". The segment over which the results of multiplying the reception data elements by these spreading code chips are integrated is divided into TS2 and TS3 taking into account the symbol segmentation.

The next code to be multiplied is "m, n, o". The segment over which the results of multiplying the reception data elements by these spreading code chips are integrated is divided into TS4 and TS5 taking into account the symbol delimiter.

Figure 3:
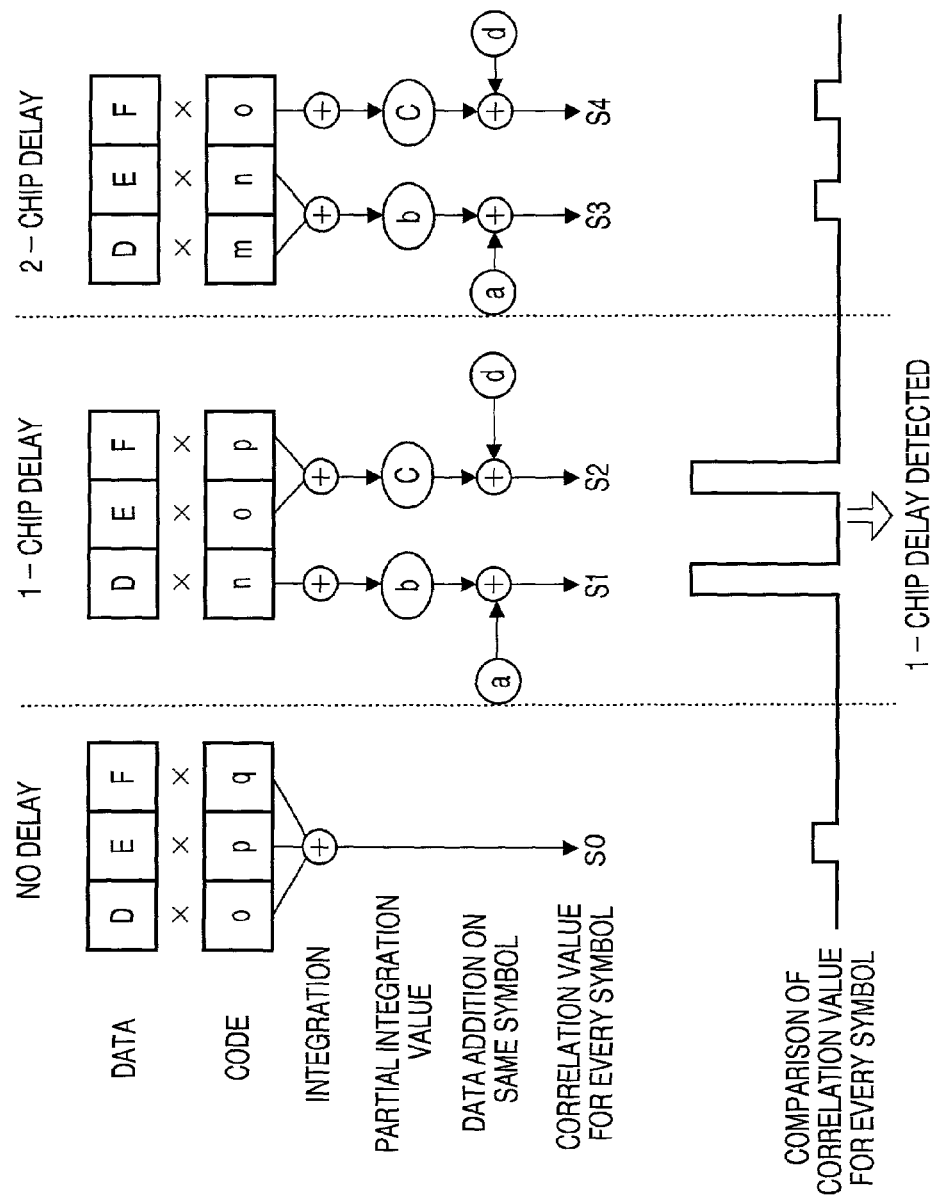
FIG. 3 illustrates a process until a correlation value is calculated in a calculation (code scan/data-fixed system) according to the matched filter of the present invention.

The above-described processing is shown in the upper part of FIG. 3. As shown in the lower part of FIG. 3, in the cases of the 1-chip delay and the 2-chip delay, integration values (b, c) obtained through partial integration are each added to integration value a corresponding to the same delay calculated in the immediately preceding cycle or integration value d corresponding to the same delay calculated in the next cycle. This makes it possible to obtain symbol-unit correlation values (values estimated to be correlation values) S0 to S4. S0 is a 1-symbol correlation value with no delay, S1 and S2 are partial correlation values of neighboring symbols in the case of the 1-chip delay, and S3 and S4 are partial correlation values of neighboring symbols in the case of the 2-chip delay.

Then, these symbol-unit correlation values S0 to S4 are compared.

As shown at the bottom of FIG. 3, in the case of the 1-chip delay, correlation peaks are detected. Therefore, it is found that the latched reception data had a 1-chip delay. That is, it is understood from FIG. 2 that the latched reception data were "D, E, F". With this, the timing of processing the reception signal has been detected.

According to the above-described method, since the input data is fixed, the limit to the speed at which data is input to the shift register (reception data transfer rate) has no problem. Moreover, since this method performs multiplications repeatedly by shifting spreading codes 1 chip at a time over a period corresponding to a propagation delay covered by the base station, it is possible to perform processing at the maximum speed of hardware. Therefore, even if the search time width (propagation delay) to calculate a correlation value exceeds a time corresponding to 1 symbol, a single matched filter is enough to handle this.

The characteristic operations described above can be summarized as shown in FIG. 4.

That is, data corresponding to a processing period is extracted and stored in memory of the matched filter (step 20).

Despreading is performed while shifting the phase 1 chip at a time, then the integration period is sequentially changed according to the number of chips of the code that has been shifted and the despreading results are integrated (step 21).

Then, when it is assumed that there is no delay of the reception signal relative to the reference timing of the base station (step 22), the value of integration of the despreading results itself becomes a correlation value with respect to 1 symbol (step 23).

On the other hand, in step 22 when it is assumed that there is a delay of the reception signal, data elements of different symbols are mixed in one data segment, and therefore the integration result with respect to the first-half symbol is added to the already calculated past (corresponding to the same delay) integration result to detect the correlation with respect to the symbol. On the other hand, for the last-half symbol, the integration result thereof is temporarily stored in memory. The stored integration result is added to the integration result with respect to part of the corresponding symbol which is calculated in the next cycle and the correlation with respect to the symbol is detected (step 24).

Then, a peak value is calculated by comparing correlation values of the respective symbols and the amount of actual delay of the reception data is detected (step 25).

This is the basic concept of data-fixed/code scanning type correlation detection of the present invention.

Figure 5:
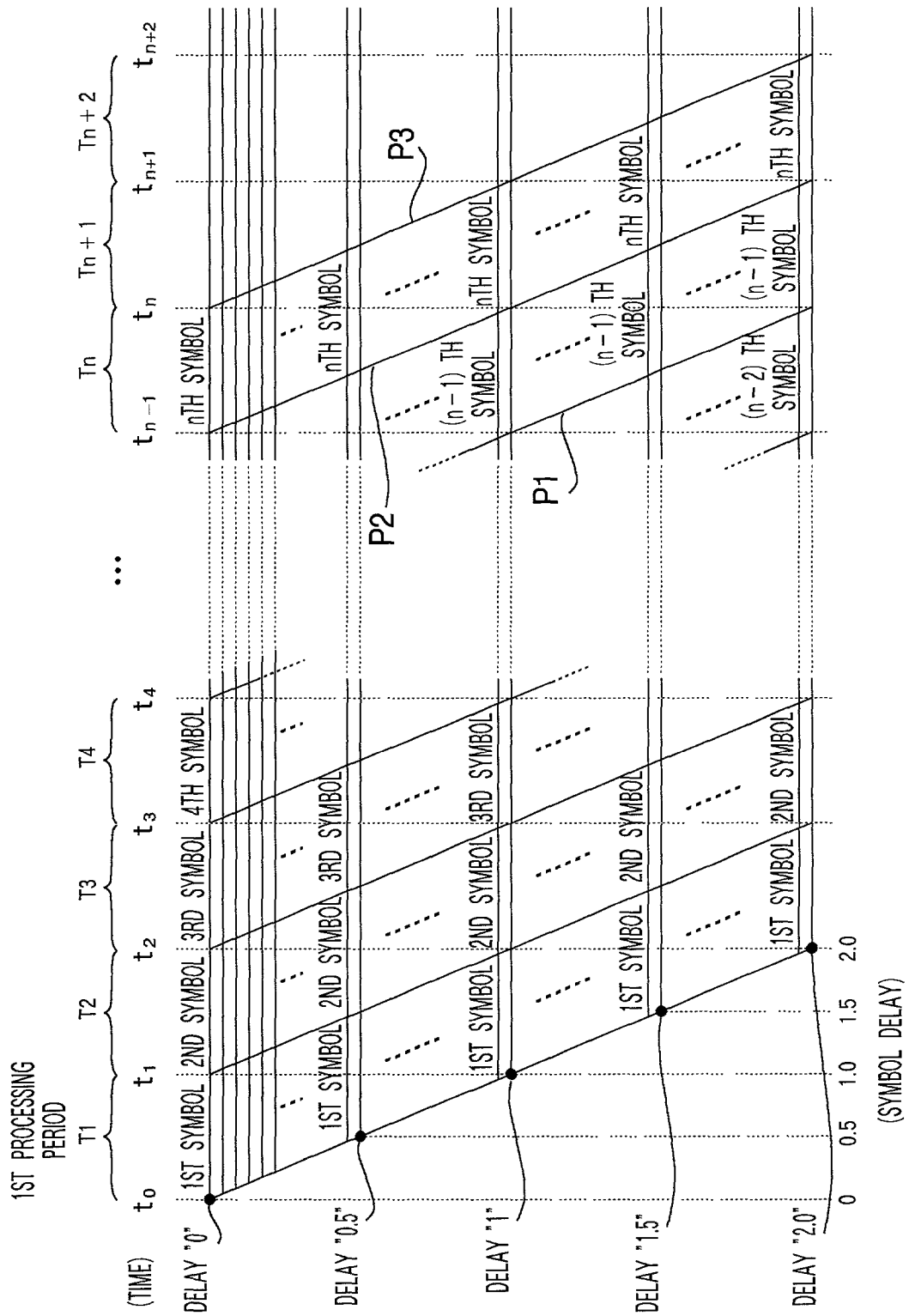
FIG. 5 illustrates a method of proceeding with a calculation through data fixing/code scanning according to the matched filter of the present invention.

FIG. 5 illustrates a relative positional relationship between the processing period and symbol delimiter of the reception signal when the search width is set to a time equivalent to 2 symbols. Each processing period (T1 to Tn+2) is a time width equivalent to 1 symbol.

Figure 4:
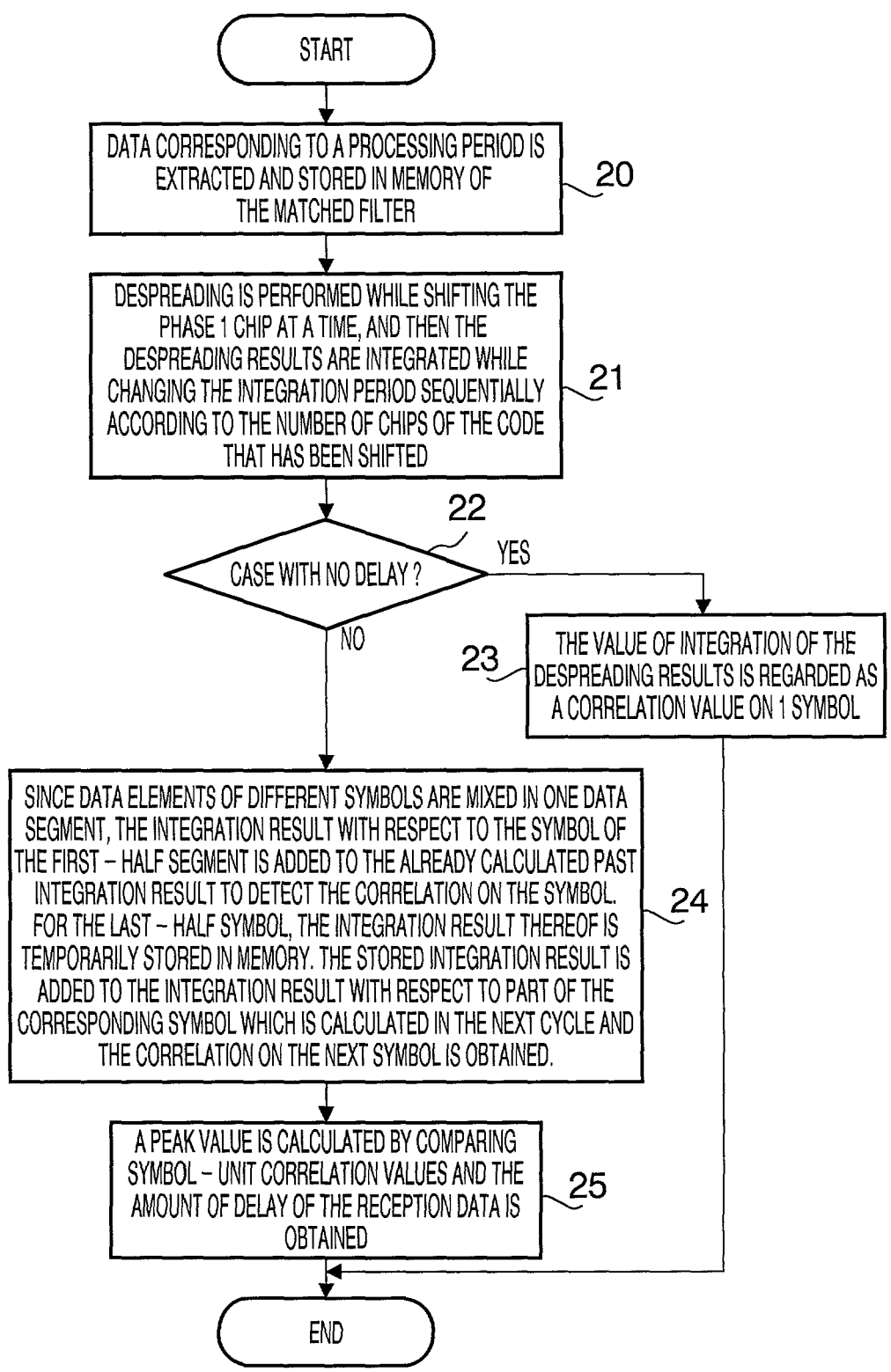
FIG. 4 is a flow chart illustrating a characteristic processing procedure of a calculation method according to the matched filter of the present invention.
Figure 6:
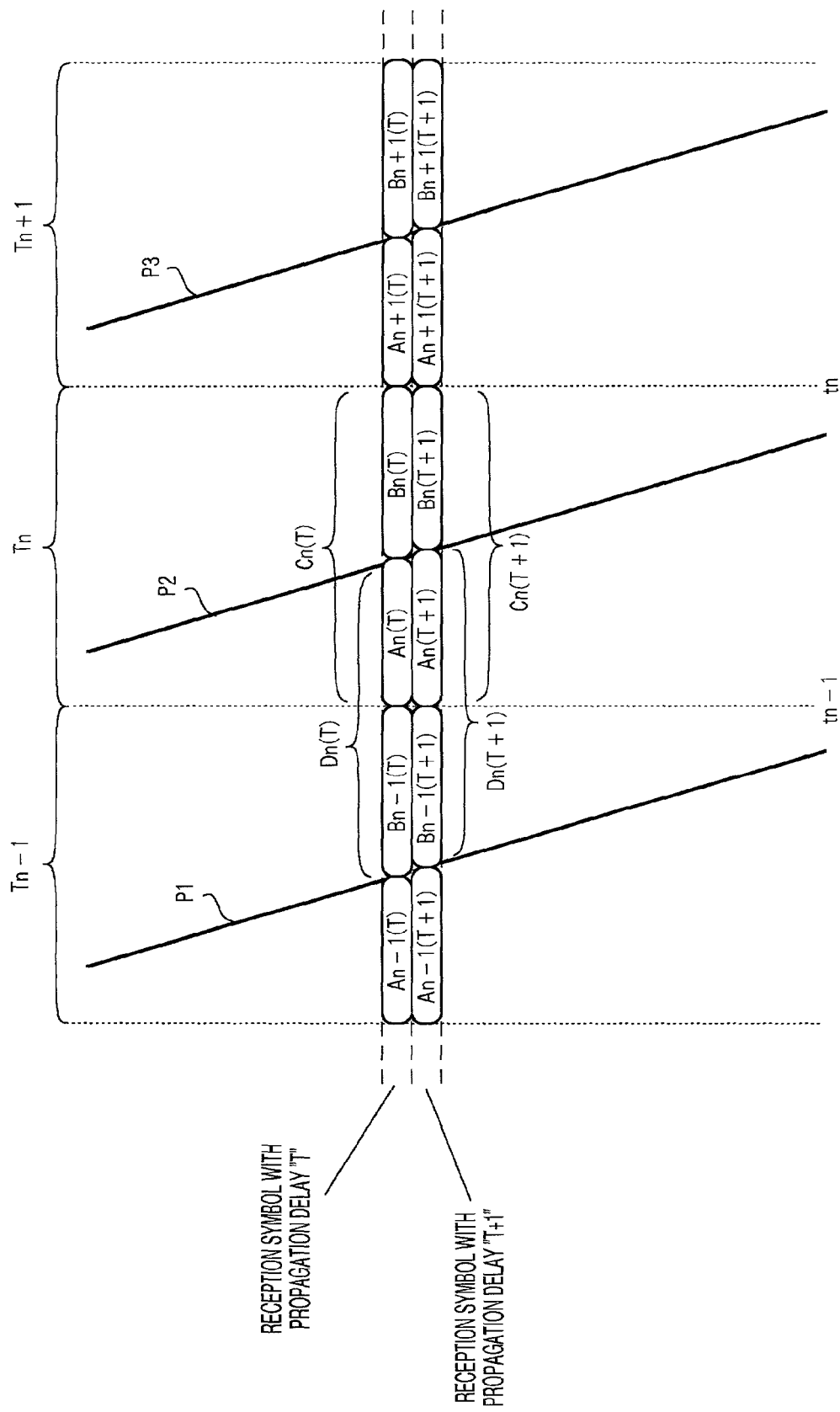
FIG. 6 illustrates a basic concept of a calculation through data fixing/code scanning according to the matched filter.

FIG. 6 is an enlarged view of part of FIG. 4. An(T) and Bn(T) in the figure indicate partial integration values of the despreading result.

In all cases of the (n−1)th processing period (Tn−1) nth processing period (Tn) and (n+1)th processing period (Tn+1), the relative positional relationship between symbol delimiters P1, P2 and P3 and the start points and end points of the processing periods (tn−2, tn−1, tn, tn+1) is the same. In FIG. 6, one processing period (e.g., Tn) is divided into two segments by a symbol delimiter (e.g., P2). The length of each part of the divided period is the same for the reception signal with the same amount of propagation delay for any processing period. Therefore, there will be no problem in each processing period, even if despreading and integration are performed and a partial integration value is calculated for each segment of the divided period independently of each other and then these partial integration values are added to the partial integration values to be calculated in the next processing period. Based on such a concept, the present invention performs partial integration processing for every processing period and adds up the partial integration values at the time of the next processing.

Here, the following discussion will be focused on a case where a propagation delay is "T".

During processing period Tn−1, partial integration value Bn−1 (T) is calculated and stored in memory (not shown).

Then, in next processing period Tn, partial integration values An(T) and Bn(T) are calculated and An(T) is added to partial integration value Bn−1(T) read from memory. A 1-symbol correlation value is calculated in this way. Bn(T) is stored in memory and added to partial integration value An+1(T) calculated in the next processing to calculate a 1-symbol correlation value.

Thus, a delay profile obtained by the data-fixed/code scan system of the present invention is completely the same as that obtained by the conventional data scan/code-fixed system.

Figure 7:
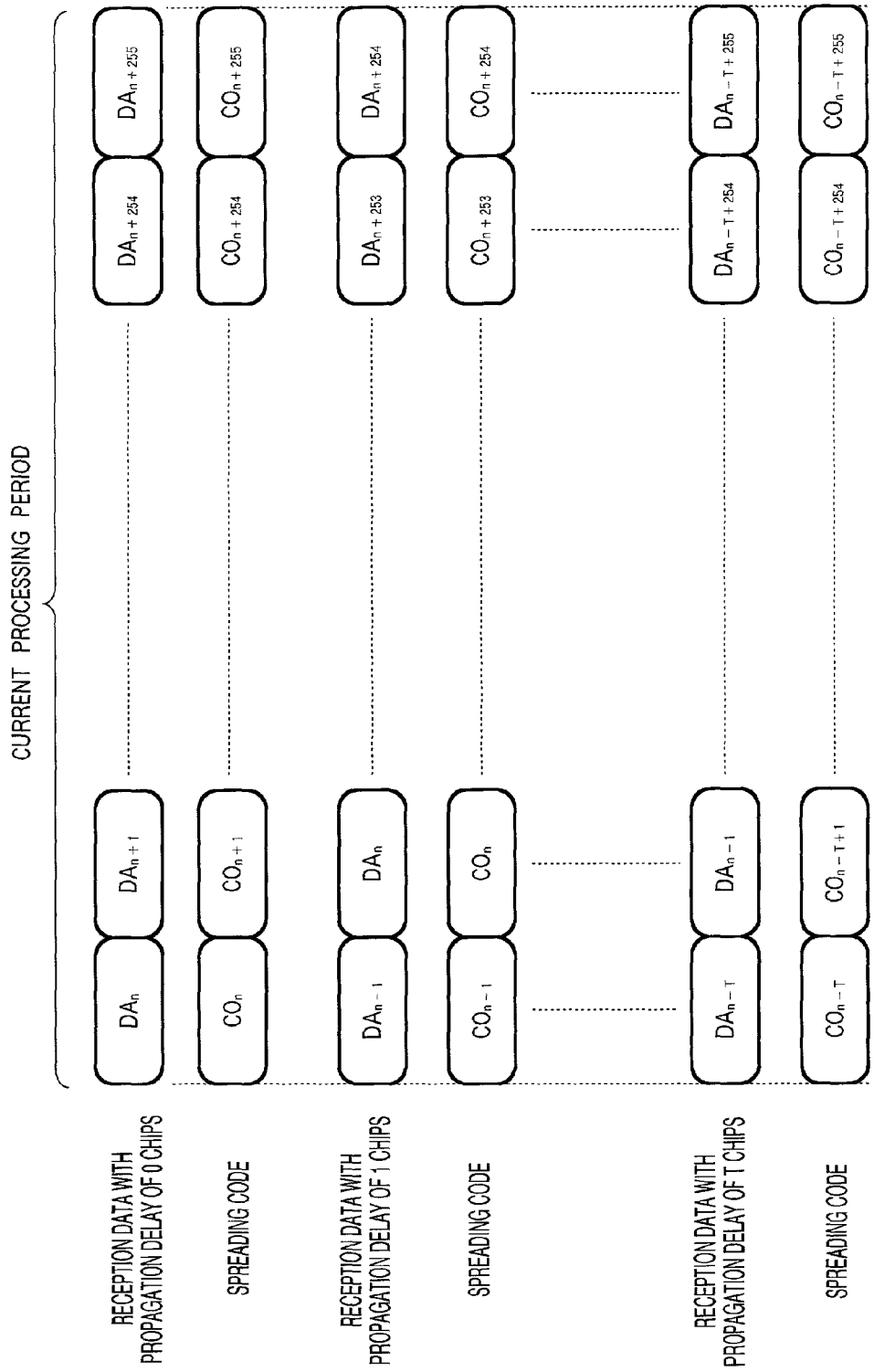
FIG. 7 illustrates a code scanning content of the matched filter of the present invention.

Here, spreading codes generated when calculations are performed for correlation detection by the data-fixed/code scan system of the present invention will be explained using FIG. 7.

As shown in the figure, reception signal DA(n) to DA(n+255) with a propagation delay of 0 chips is multiplied by spreading code C0(n) to C0(n+255). Likewise, reception signal DA(n−1) to DA(n+254) with a propagation delay of 1 chip is multiplied by spreading code C0(n−1) to C0(n+254).

Here, if attention is focused on a change of the spreading code caused by a change of the amount of propagation delay of the reception signal, it is observed that every time the propagation delay is incremented by 1 chip, the spreading code is shifted 1 chip backward.

Therefore, using the spreading code with a propagation delay of 0 chips as an initial value, spreading codes are generated one after another with their respective contents shifted one chip at a time. These sequentially generated spreading codes are multiplied on fixed data.

With reference now to the attached drawings, embodiments of the present invention will be explained below.

(Embodiment 1)

Figure 8:
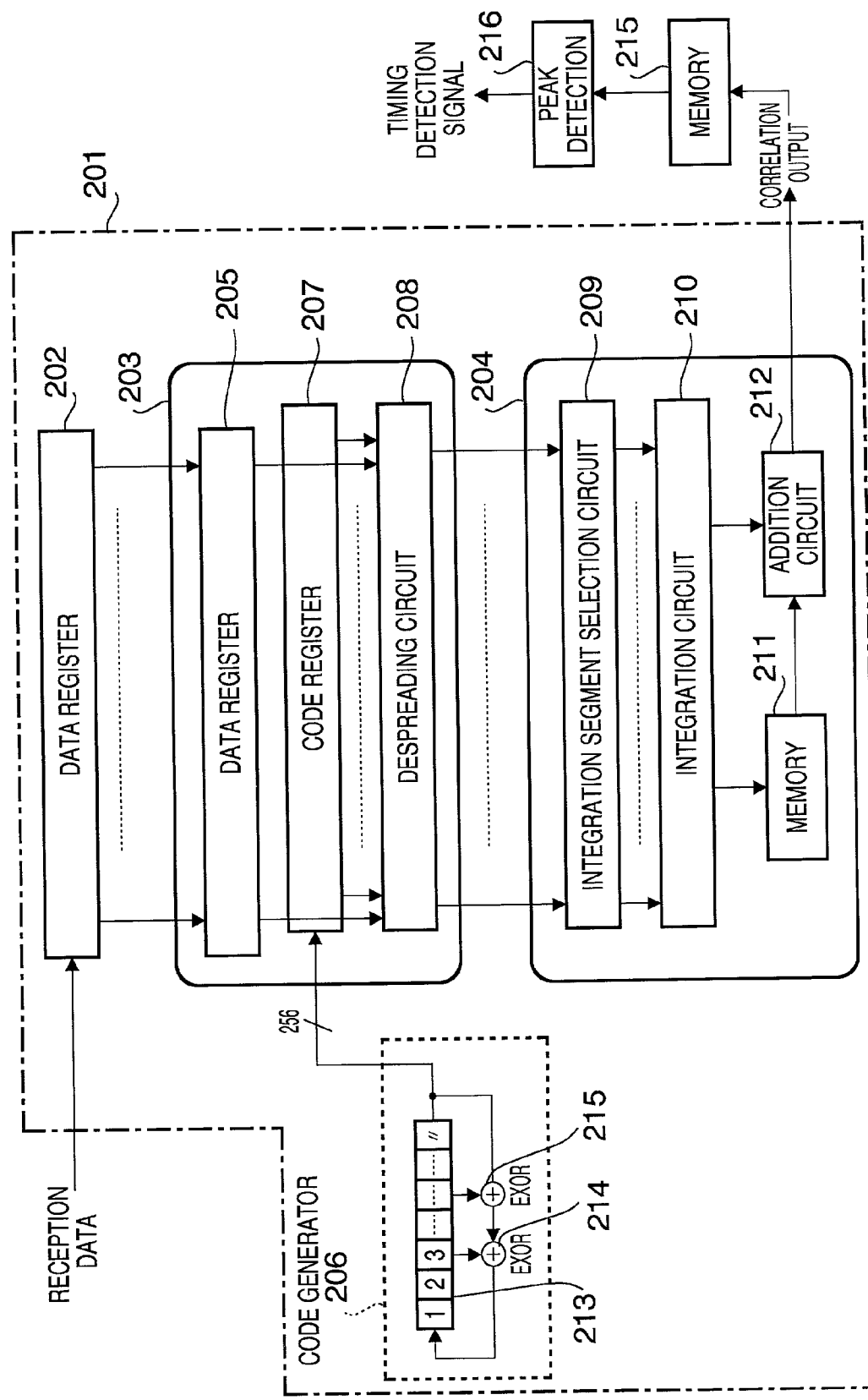
FIG. 8 is a block diagram showing a basic configuration of the matched filter that carries out a calculation through data fixing/code scanning according to the present invention.

FIG. 8 shows a basic configuration example of a matched filter of the present invention.

Matched filer circuit 201 of the present invention includes data register 202 that receives reception data serially and outputs data in parallel, despreading calculation section 203, integration calculation section 204 and code generator 206 that generates spreading codes (despreading codes).

Data register 202 is fed reception data serially. Then, when 1-symbol data corresponding to one processing period (Tn) is stored as explained using FIG. 5 and FIG. 6, data register 202 outputs the reception data in parallel. That is, data register 202 functions as a serial/parallel conversion circuit.

The data output in parallel from data register 202 is latched into data register 205.

Code generator 206 includes a recursive shift register constructed by combining exclusive OR circuits 214 and 215, and shift register 213. This recursive shift register is a generator of M series spreading codes. This code generator 206 generates spreading codes which are shifted 1 chip at a time. In this embodiment, code generator 206 outputs spreading codes each corresponding to 1 symbol (=256 chips) in parallel.

The 256-bit spreading codes generated from this code generator 206 are stored in code register 207.

Spreading circuit 208 multiplies the 1-symbol equivalent reception data output in parallel from data register 205 by spreading codes output in parallel from code register 207.

Integration calculation section 204 includes integration segment selection circuit 209, integration circuit 210, memory 211 and addition circuit 212.

Integration segment selection circuit 209 receives data bits indicating a despreading calculation result of 256 bits output from despreading circuit 208 in parallel. The integration segment selection circuit divides the 256-bit data into two segments at an arbitrary position and can output only data bits of one group in parallel. That is, the integration segment selection circuit can select data bits to be sent to integration circuit 210 from among the 256-bit data. This realizes partial integration in each processing period explained in FIG. 6. More specifically, integration segment selection circuit 209 automatically changes from one integration segment to another in association with a supposed amount of delay of the reception data. The delimiting point between integration segments (position at which 256-bit data is divided into two segments) is a position (P1, P2, P3 in FIG. 6) which could always serve as a delimiter for 1 symbol as shown in FIG. 6.

Integration circuit 10 executes an integration calculation, which gives partial integration values (An(T) and Bn(T) if the current processing period is Tn) shown in FIG. 6.

One of the partial integration values (e.g., Bn(T) in FIG. 6) is written to memory 211. Memory 211 has an address space equivalent to a propagation delay. The other partial integration value output from integration circuit 210 (e.g., An(T) in FIG. 6) is added by addiction circuit 212 to the partial integration value obtained in the previous processing (e.g., Bn−1(T) in FIG. 6) read from memory 211. This gives a correlation value with respect to 1 symbol.

The correlation value (correlation output) obtained is temporarily stored in memory 215.

Then, peak detection circuit 216 compares among the stored correlation values and find a correlation peak. An amount of delay of the reception data is determined according to this correlation peak. In this way, the timing for processing the reception signal is detected (FIG. 3).

Figure 9:
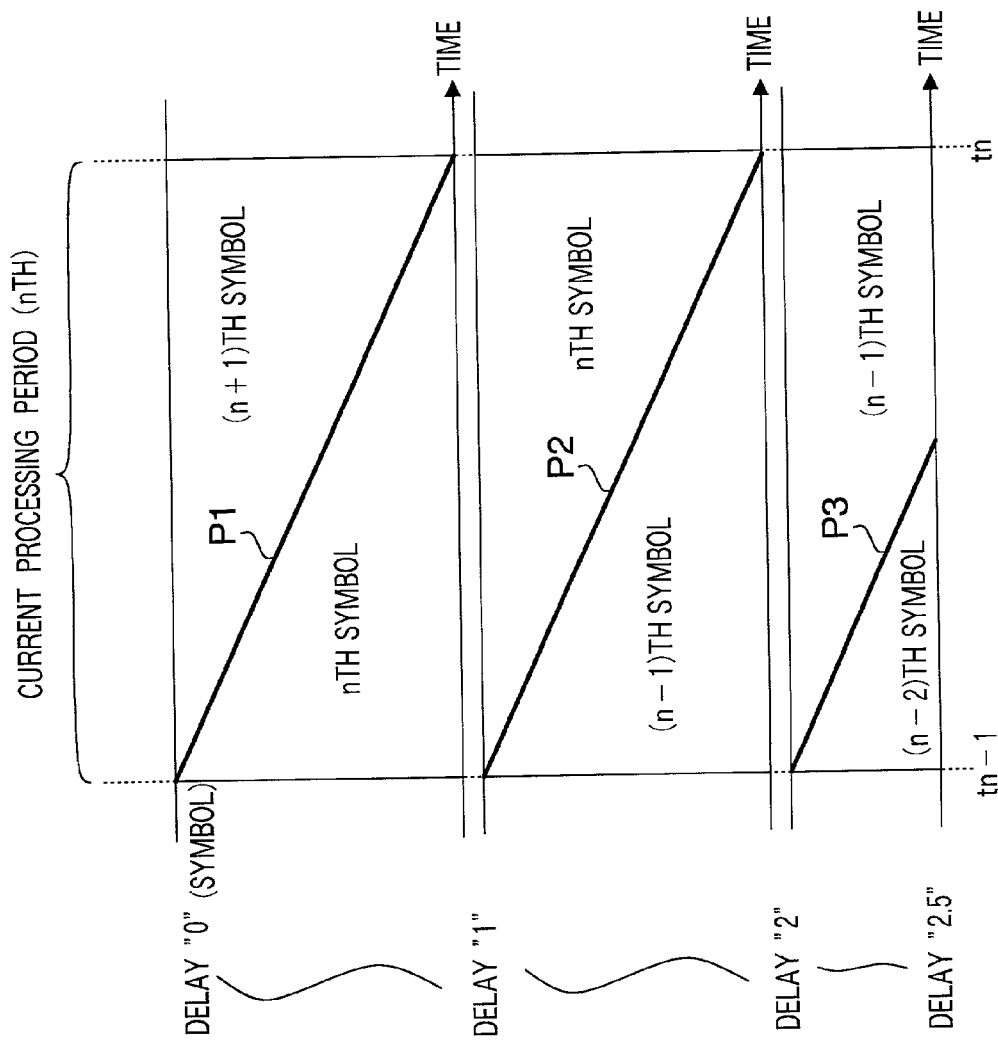
FIG. 9 illustrates an outline of an operation of an integration segment selection circuit of the matched filter in FIG. 8.

FIG. 9 illustrates an operation of integration segment selection circuit 209.

As described above, integration segment selection circuit 209 automatically changes from one integration segment to another in association with a supposed amount of delay of the reception data. The delimiting point between integration segments (position at which 256-bit data is divided into two segments) is a position (P1, P2, P3 in FIG. 6) which could always serve as a delimiter for 1 symbol in the actual reception data as explained in FIG. 6.

Thus, as shown in FIG. 8, over a range of propagation delay of 0 chips to 1 chip of the reception signal, the 256-bit data is divided into two segments at symbol delimiter P1 and in this way the integration period is automatically determined. Likewise, over a range of propagation delay of 1 chip to 2 chips, the integration period is determined according to symbol delimiter P2 and over a range of propagation delay of 2 chips to 2.5 chips, the integration period is determined according to symbol delimiter P3.

In this way, integration segments are changed one after another by integration period selection circuit 209 according to symbol segments of the reception signal.

(Embodiment 2)

Figure 10:
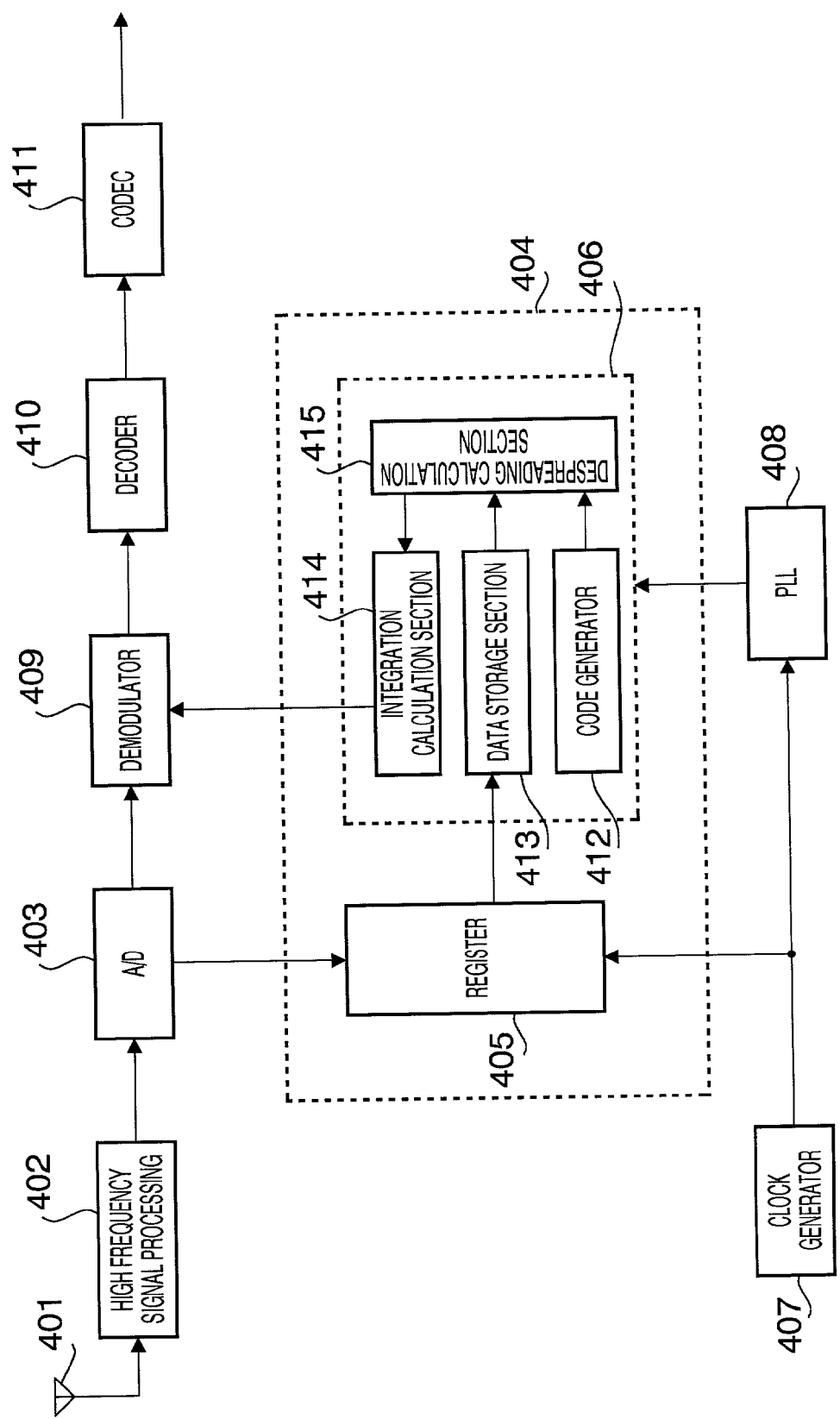
FIG. 10 is a block diagram showing a configuration of a CDMA receiver incorporating the matched filter of the present invention.

FIG. 10 is a block diagram showing a main configuration of a CDMA reception apparatus incorporating the matched filter of the present invention.

This receiver includes reception antenna 401, high frequency signal processing section 402 that carries out predetermined filtering and amplification, A/D converter 403, demodulator 409, decoder 410, CODEC section 411 that converts a decoded signal to voice, matched filter 404, clock generator 407 and PLL circuit 408.

A reception signal subjected to spectrum spreading is converted from serial to parallel at data register 405 of matched filter 404, stored and fixed in a data register of correlation calculation section 406.

Matched filter 404 can multiply fixed data by codes at high speed based on a high-speed clock signal supplied from PLL circuit 408. Thus, matched filter 404 implements extremely high-speed despreading calculation processing.

This allows the CDMA reception apparatus equipped with the matched filter of the present invention to carry out data-fixed/code scanning calculations at high speed and thereby allows single matched filter 404 to even handle a case where the search range required by the system exceeds a 1-symbol time. Thus, using the CDMA reception apparatus of the present invention makes it possible to easily extend the radius of a cell of the base station.

Furthermore, since the matched filter of the present invention can carry out calculations extremely fast, delay profile calculations under different conditions can be performed, for example, on a time-division basis. That is, the matched filter of the present invention is capable of performing high-level processing faster with smaller hardware. With this, it is possible to implement a high-function cellular phone with low power consumption.

(Embodiment 3)

Figure 11:
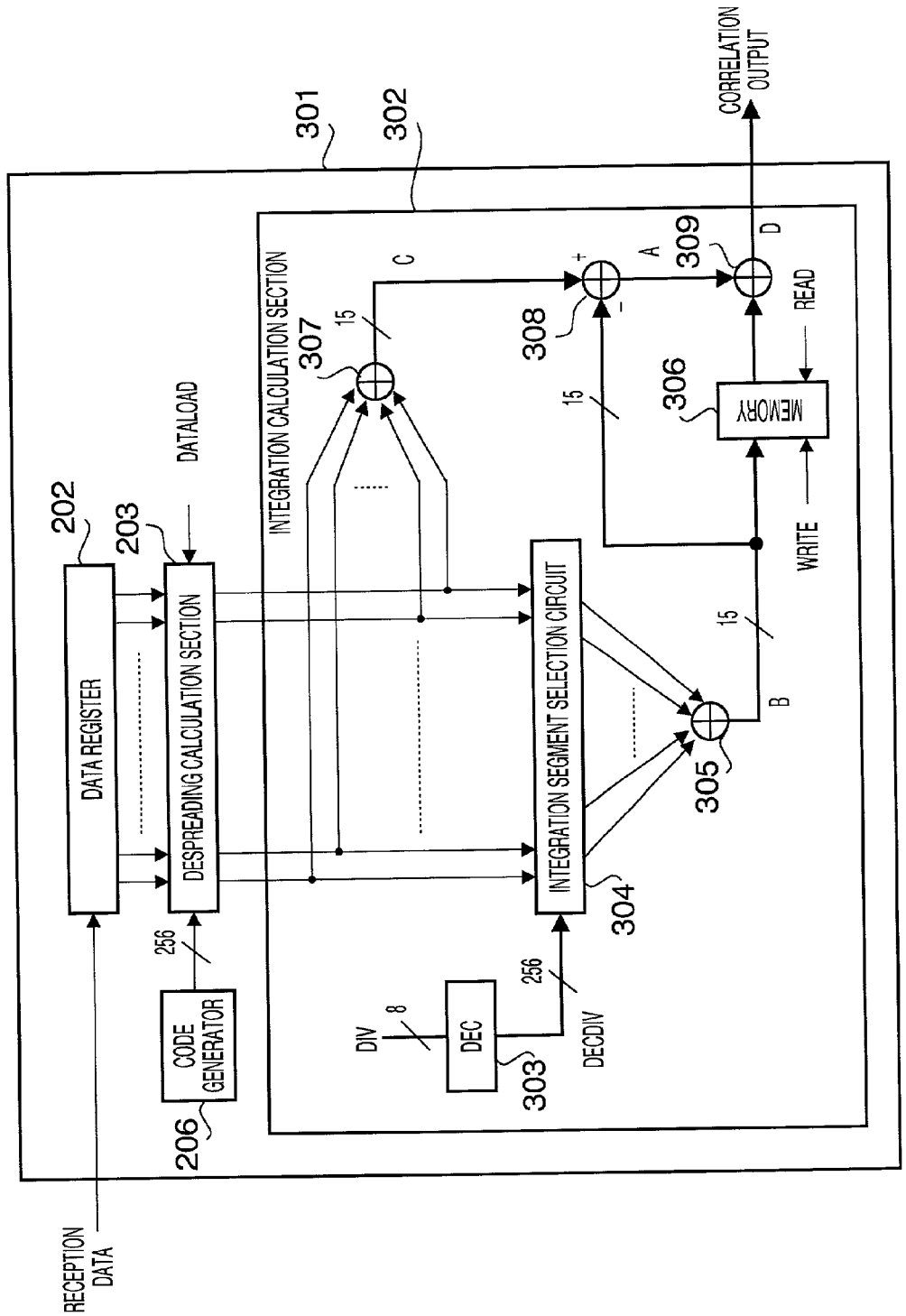
FIG. 11 is a block diagram of a matched filter according to Embodiment 1 of the present invention.

FIG. 11 is a block diagram showing another configuration example of a matched filter according to the present invention.

This matched filter circuit 301 includes data register 202, code generator 206, despreading calculation section 203 and integration calculation section 302.

Integration calculation section 302 includes integration segment selection circuit 304, decoder section 303 that generates signals to control integration segment selection circuit 304, adder 305 that carries out an addition on the results of a selected integration segment, adder 307 that adds up all outputs from despreading calculation section 203, calculator 308 that subtracts the result of adder 305 from the result of adder 307, memory 306 that stores the result of adder 305 and adder 309 that adds up the output of calculator 308 and the content read from memory 306.

Data is read from despreading calculation section 203 based on a DATALOAD signal. An integration segment of integration segment selection circuit 304 is specified based on a DECDIV signal output from decoder section 303. The DECDIV signal of decoder section 303 is generated based on a DIV signal.

When data is read from memory 306, an address is specified by an ADDRESS signal and a READ signal is input. When data is written to memory 306, a WRITE signal is input. A read and write from/to memory 306 can be performed simultaneously according to a same clock.

In the matched filter in FIG. 11, adder 307 adds up all despreading results corresponding to 1 symbol during one processing period (e.g., Tn in FIG. 6) (An(T)+Bn(T) in FIG. 6).

Furthermore, integration segment selection circuit 304 partially integrates the data (Bn(T) in FIG. 6) of the segment after a symbol delimiter (P2 in FIG. 6).

Then, calculator 308 subtracts the output of adder 305 (Bn(T) in FIG. 6) from the output of adder 307 (An(T)+Bn(T) in FIG. 6). On the other hand, calculator 308 writes the output of adder 305 (Bn(T)) to memory 306 and at the same time reads a partial integration value (Bn−1(T) in FIG. 6) calculated by the immediately preceding processing from memory 306.

Then, adder 309 adds up a partial integration value (Bn−1(T) in FIG. 6) output from memory 306 and the output of adder 308 (An(T) in FIG. 6). This gives a correlation value on 1 symbol (Bn−1(T)+An(T) in FIG. 6).

Then, more specific operations of data register 202, despreading calculation section 203 and integration calculation section 302 in FIG. 11 will be explained.

Figure 12:
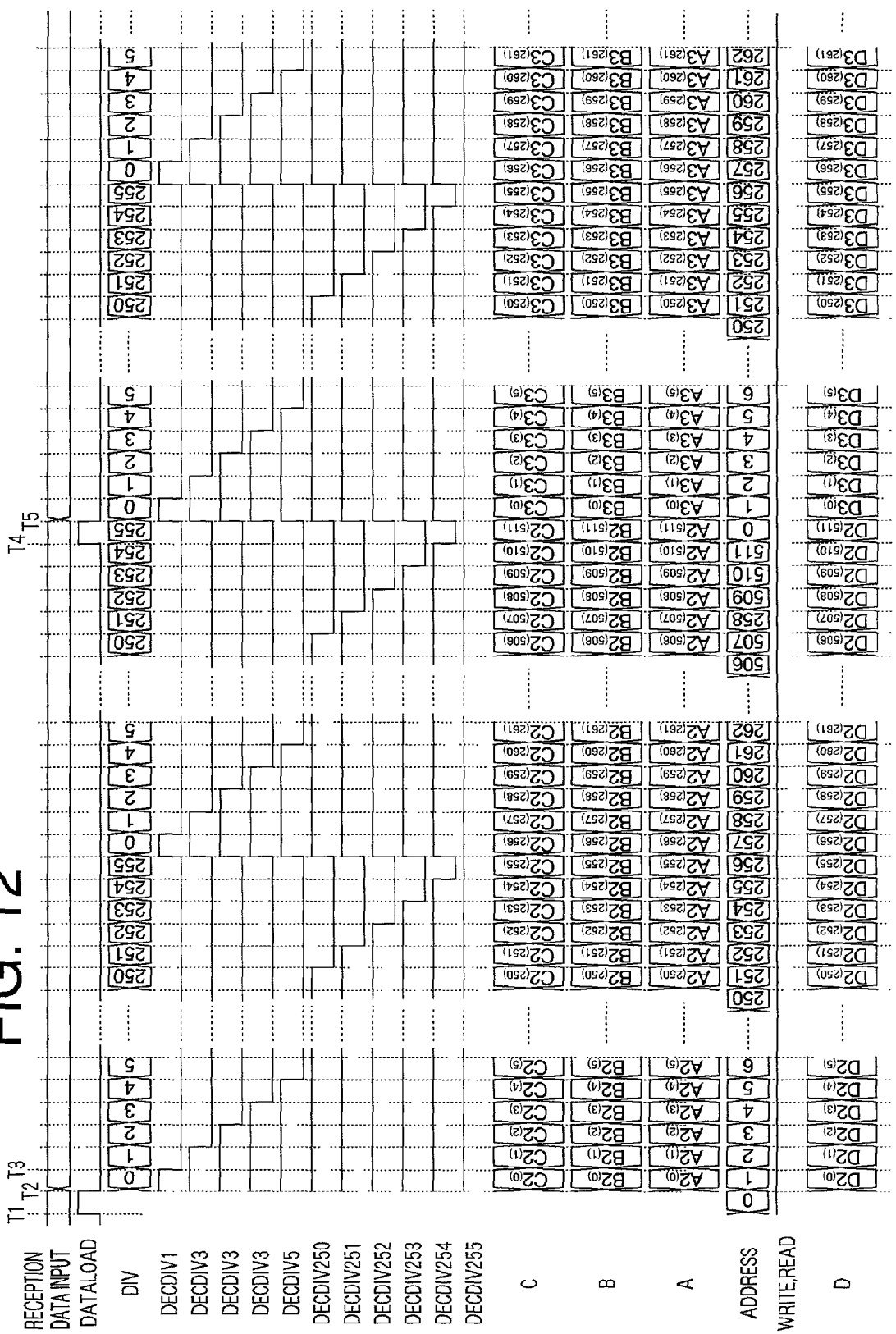
FIG. 12 is a timing chart showing an operation of the matched filter in FIG. 11.

FIG. 12 is a timing chart showing an operation of a calculation circuit of the matched filter of Embodiment 1 of the present invention. A to D described in FIG. 12 represent signals A to D in FIG. 11.

Data register 202 is always fed reception data serially.

First, a DATALOAD signal is validated at time T1, and the content of data register 202 is taken into despreading calculation section 203 at time T2 synchronized with the clock signal.

At time t2, a spreading code to despread a reception symbol which is a calculation target and arrives with a propagation delay of 0 is stored in despreading calculation section 203 and a despreading calculation is performed.

Furthermore, at same time T2, adder 307 adds up all outputs of despreading calculation section 203 and outputs the addition result as C2(0) in FIG. 12.

Furthermore, at same time T2, a DIV signal given to decoding circuit 303 becomes "0" and as a result, all bits of a 256-bit DECDIV signal are fixed at a high level and these are given to integration segment selection circuit 304.

Since all bits of the DECDIV signal are fixed at a high level, integration segment selection circuit 304 fixes all the outputs at a low level. Adder 305 outputs "0" as B2(0) in FIG. 12.

At the same timing, value "0" is read as B1(0) during the immediately preceding processing period from the address indicated by an ADDRESS signal of memory 306.

Immediately after this, B2(0) is written at the same address of memory 306.

As a result, calculator 308 outputs a value obtained by subtracting B2(0) from C2(0), that is, A2(0) and adder 309 adds up B1(0) read from memory 306 and output A2(0) of adder 309 and outputs as correlation calculation result D2(0) in FIG. 12.

The calculation contents from time T3 onward are repetitions of the above-described contents.

A DIV signal from time T2 to time T4 changes in connection with a supposed propagation delay of a reception target symbol and "0" to "255" are repeated.

DECDIV1 to DECDIV255 in FIG. 12 vary periodically based on the DIV signal with patterns shown in FIG. 12.

Furthermore, memory 306 includes a data storage area corresponding to the supposed propagation delay of a reception target symbol. The area to be accessed is changed according to a propagation delay of a reception signal.

Since the WRITE and READ signals in FIG. 12 can perform a read and write operations according to a same clock to/from memory 306, memory 306 is always active during calculations.

The timing chart in FIG. 12 shows an example where a delay profile of a 511-chip equivalent search width is generated during one 256-chip processing period. By increasing the clock rate used for calculation processing, it is possible to handle larger search widths.

Thus, the calculation circuit of the matched filter of this embodiment can output correlation calculation results according to a data-fixed/code scan system for every one clock.

(Embodiment 4)

Figure 13:
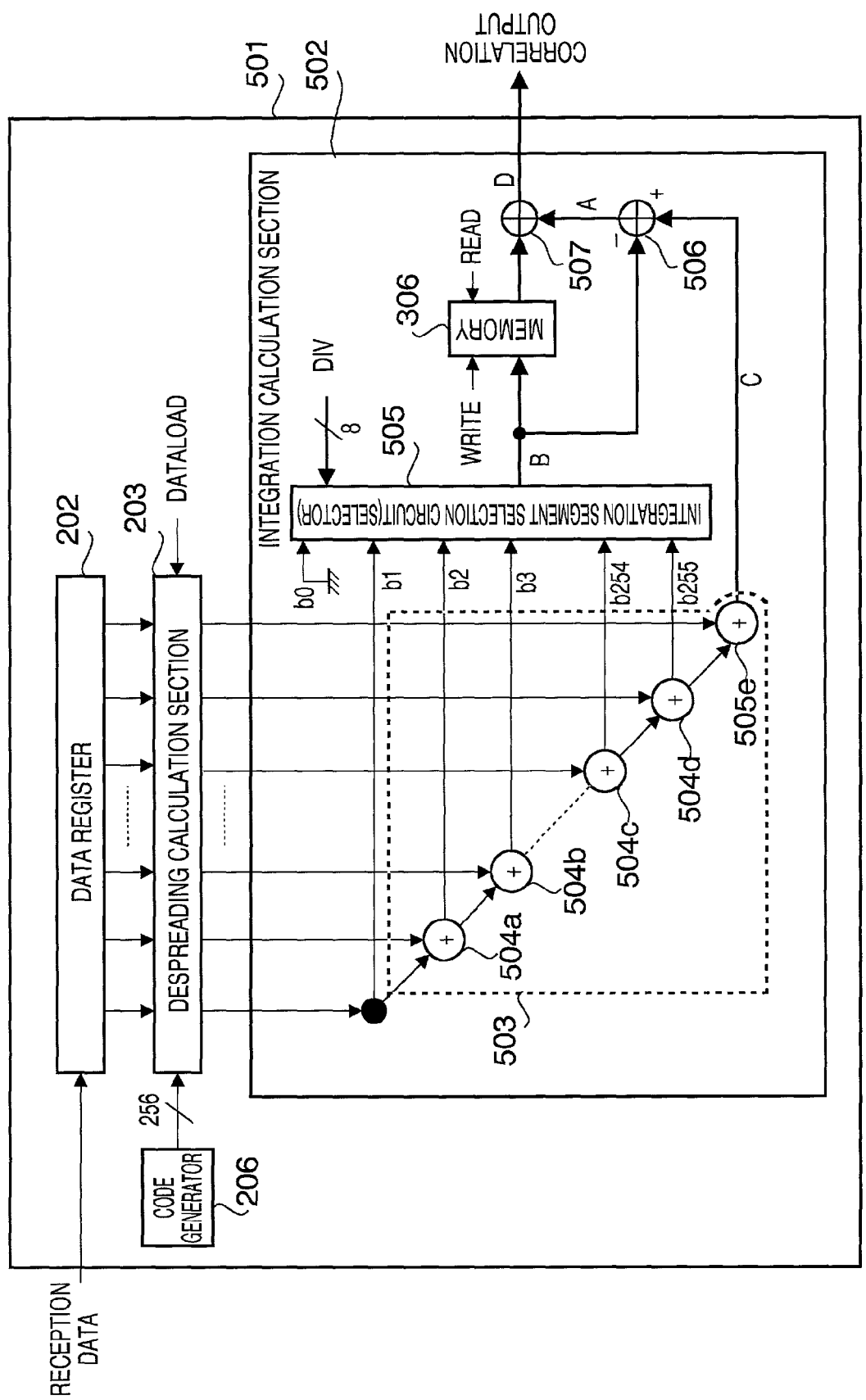
FIG. 13 is a block diagram of a matched filter according to Embodiment 2 of the present invention.

FIG. 13 is a block diagram showing a configuration of another embodiment of a matched filter of the present invention.

The function and operation of the matched filter of this embodiment are the same as those of the matched filter in FIG. 11. However, in this embodiment, a cumulative addition of spread data is carried out in advance. This makes it possible to construct an integration segment selection circuit with a selector, which can simplify the circuit.

Matched filter circuit 501 in FIG. 13 includes data register 202, code generator 206, despreading calculation section 203 and integration calculation section 502.

Integration calculation section 502 includes cumulative addition section 503, integration segment selection circuit 505, memory 306 and calculators 506 and 507.

Cumulative addition section 503 includes a plurality of addition elements 504a to 505e. The plurality of addition elements 504a to 505e has a function of cumulatively adding 256-bit data output from despreading calculation section 203 sequentially starting from the least significant bit. In FIG. 13, b1 to b255 each denote data indicating cumulative addition results.

Integration segment selection circuit 505 selects any one (data B in the figure) of the data indicating the 255 cumulative addition results output from cumulative addition section 503. Data B is written to memory 306 and sent to calculator 506 as well.

The result (data C in the figure) of an addition of all data bits indicating despreading results is obtained from adder 505e. Calculator 506 carries out a calculation of (C-B), and as a result obtains data A. This data A is added to the data read from memory 306, giving correlation output D.

Data is read from despreading calculation section 203 based on a DATALOAD signal. An integration segment of integration segment selection circuit 505 is specified based on a DIV signal.

Data register 202, code generator 206, despreading calculation section 203, memory 306, calculator 506 and adder 507 are the same as those of the foregoing embodiments, and therefore explanations thereof will be omitted.

Figure 14:
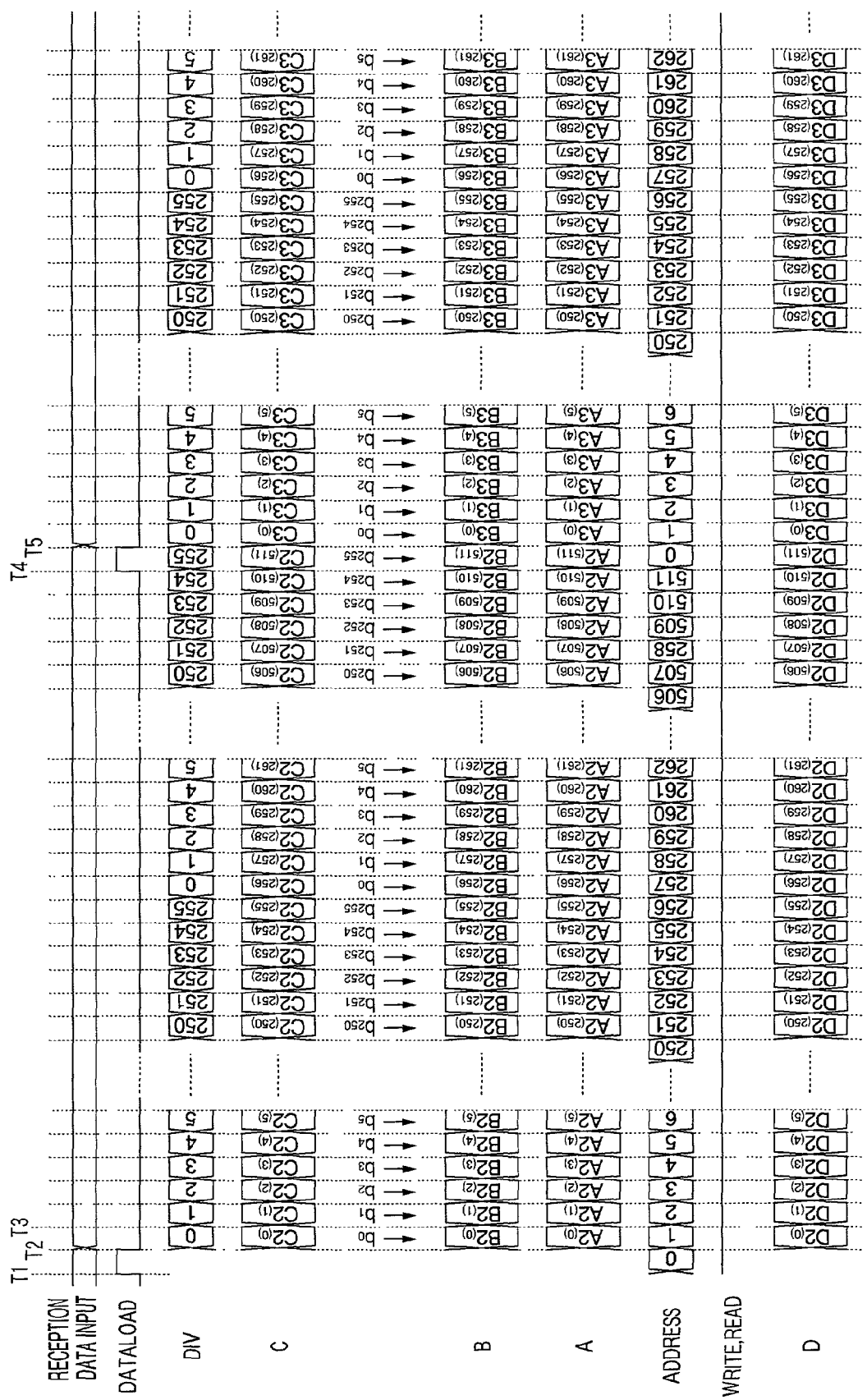
FIG. 14 is a timing chart showing an operation of the matched filter in FIG. 13.

FIG. 14 is a timing chart showing an operation of the matched filter shown in FIG. 13.

First, a DATALOAD signal is validated at time T1, and the content of data register 202 is taken into despreading calculation section 203 at time T2 synchronized with the clock signal.

Furthermore, at same time T2, adder block 503 cumulatively adds up outputs of the respective taps of despreading calculation section 203 one after another and outputs b2 to b255 as the addition results of the respective taps as C2(0) in FIG. 14.

At same time T2, a DIV signal becomes "0" and as a result, the DIV signal is output as B2(0) in FIG. 14 from integration segment selection circuit 505.

At the same timing, data "0" acquired from memory 306 at the immediately preceding processing is read as B1(0) in FIG. 14.

As a result, calculator 506 outputs a value obtained by subtracting B2(0) from C2(0), that is, A2(0). Then, adder 507 adds up B1(0) read from memory 306 and output A2(0) of adder 309 to obtain correlation calculation result D2(0) in FIG. 14.

The calculation contents from time T3 onward are repetitions of the above-described contents.

Thus, the matched filter of this embodiment can output data fixed/code scanning correlation calculation results for every one clock. Furthermore, the matched filter of this embodiment can construct an integration segment selection circuit with a selector, which simplifies the circuit.

(Embodiment 5)

Figure 15:
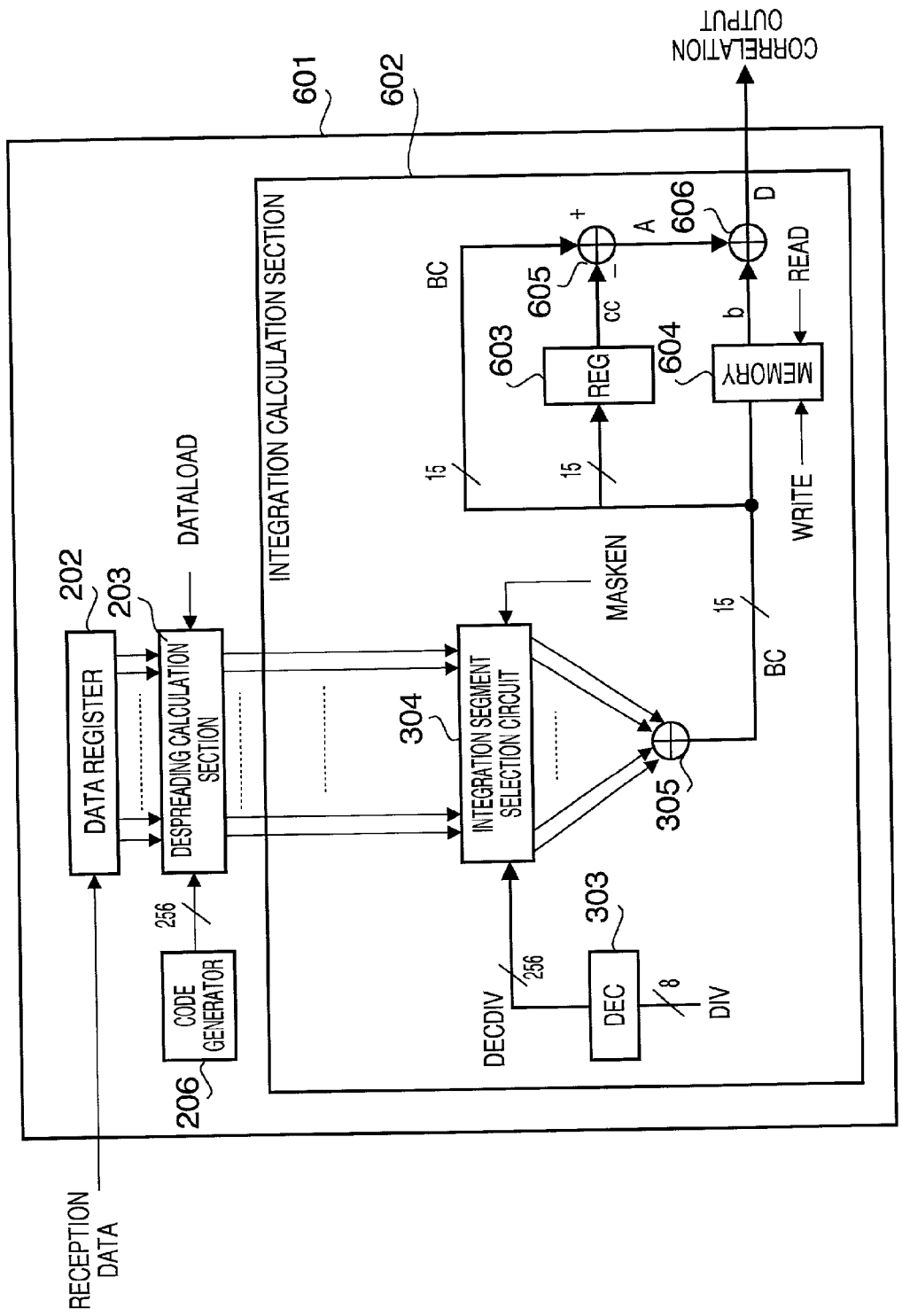
FIG. 15 is a block diagram of a matched filter according to Embodiment 3 of the present invention.

FIG. 15 is a block diagram showing a configuration of another example of a matched filter of the present invention.

The basic function and operation of the matched filter of this embodiment are the same as those of the foregoing embodiments. However, this embodiment processes two pieces of reception data alternately using one integration segment selection circuit on a time-division basis. When the number of available circuits is smaller than the number of signals to be processed, this configuration is suited to a case where one circuit is shared.

As opposed to the foregoing embodiments where a correlation value is output once for every one clock, in this embodiment, a correlation value with respect to one reception signal is output once for every two clocks.

In this embodiment, the signal input to the matched filter is a signal obtained by placing two types of reception signal data for one chip after another alternately and combining the two signals. That is, if the two types of signals are Q and W, the input signals are placed for one chip after another alternately such as Q1, W1, Q2, W2 . . . . It is possible to select a signal whose correlation value should be calculated by changing the cycle of a MASKEN signal.

This matched filter circuit 601 includes data register 202, code generator 206, despreading calculation section 203 and integration calculation section 602.

Integration calculation section 602 includes integration segment selection circuit 304, decoder section 303, adder 305, register 603, calculator 605 that subtracts the data value output from register 603 from the addition result of adder 305, memory 604 and adder 606 that adds up the output of calculator 605 and the data read from memory 604.

Data is read from despreading calculation section 203 based on a DATALOAD signal. An integration segment of integration segment selection circuit 304 is specified based on a DECDIV signal and MASKEN signal output from decoder section 303. The content of the DECDIV signal output from decoder section 303 is determined based on a DIV signal.

A read from memory 604 is carried out according to a clock different from that of a write to memory 604.

Figure 16:
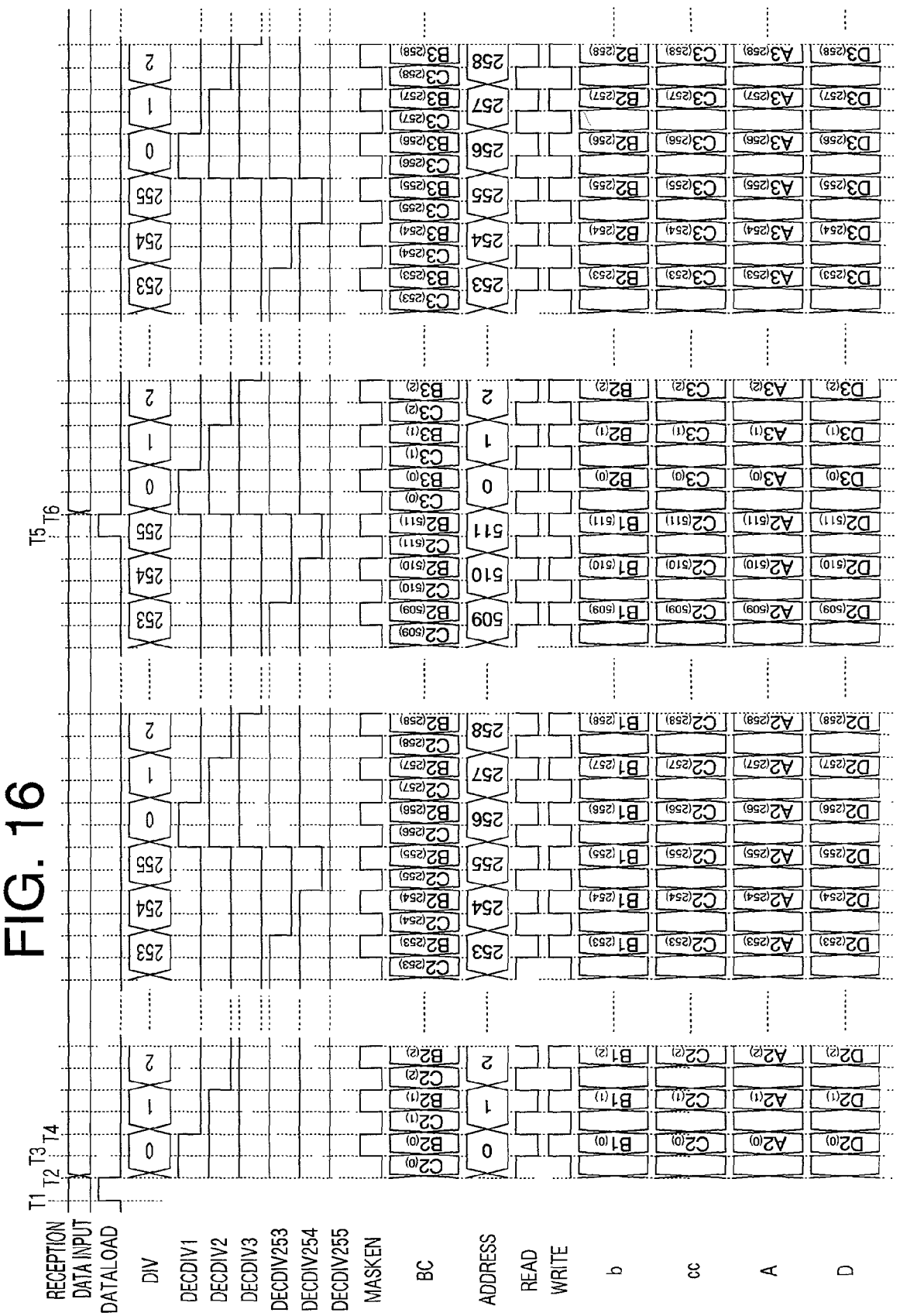
FIG. 16 is a timing chart showing an operation of the matched filter in FIG. 15.

FIG. 16 is a timing chart showing an operation of the matched filter in FIG. 15.

Data register 202 is always fed reception data serially.

A DATALOAD signal is validated at time T1, and the data retained in data register 202 is taken into despreading calculation section 203 at time T2 synchronized with the clock signal.

At time T2, a spreading code to despread the reception symbol to be calculated with a propagation delay of "0" is set in despreading calculation section 203, a despreading calculation is performed and the result is retained until time T4.

At same time T2, a DIV signal to decoding circuit 303 becomes "0" and a MASKEN signal to be given to integration segment selection circuit 203 is invalidated. This causes the output of despreading calculation section 203 to pass through integration segment selection circuit 203 and output as is.

As a result, the output of adder 305 becomes equivalent to the sum total of all the output bits of despreading calculation section 203. This is data C2(0) in FIG. 16.

Then, at time T3, C2(0) is written to register 603.

At time T3, the MASKEN signal is validated. Furthermore, at time T2, the DIV signal drives all bits of the DECDIV signal to a high level. This causes all the output of integration segment selection circuit 304 to be fixed at a low level.

The addition result of adder 305 becomes "0",. This addition result is B2(0) in FIG. 16.

Calculator 605 outputs result A2(0) obtained by subtracting B2(0) from C2(0).

At time T2, a READ signal is validated. Then, at time T3, data B1(0) is output from memory 604.

Adder 606 outputs correlation calculation result D2(0) which is a sum of A2(0) and B1(0).

At time T4, data C2(0) is written at the same address of memory 604.

The calculation contents from time T4 onward are repetitions of the contents described above.

The DIV signal from time T2 to time T6 has the same function as that described in the foregoing embodiments, but is different from the foregoing embodiments in that it has 2 clock cycles.

DECDIV1 to DECDIV255 change periodically with patterns shown in FIG. 16 based on the DIV signal.

The matched filter according to this embodiment can output a data-fixed/code scan type correlation calculation result every two clocks. Moreover, use of the integration segment selection circuit on a time-division basis makes it possible to exploit limited hardware resources to the full to process many signals.

(Embodiment 6)

Figure 17:
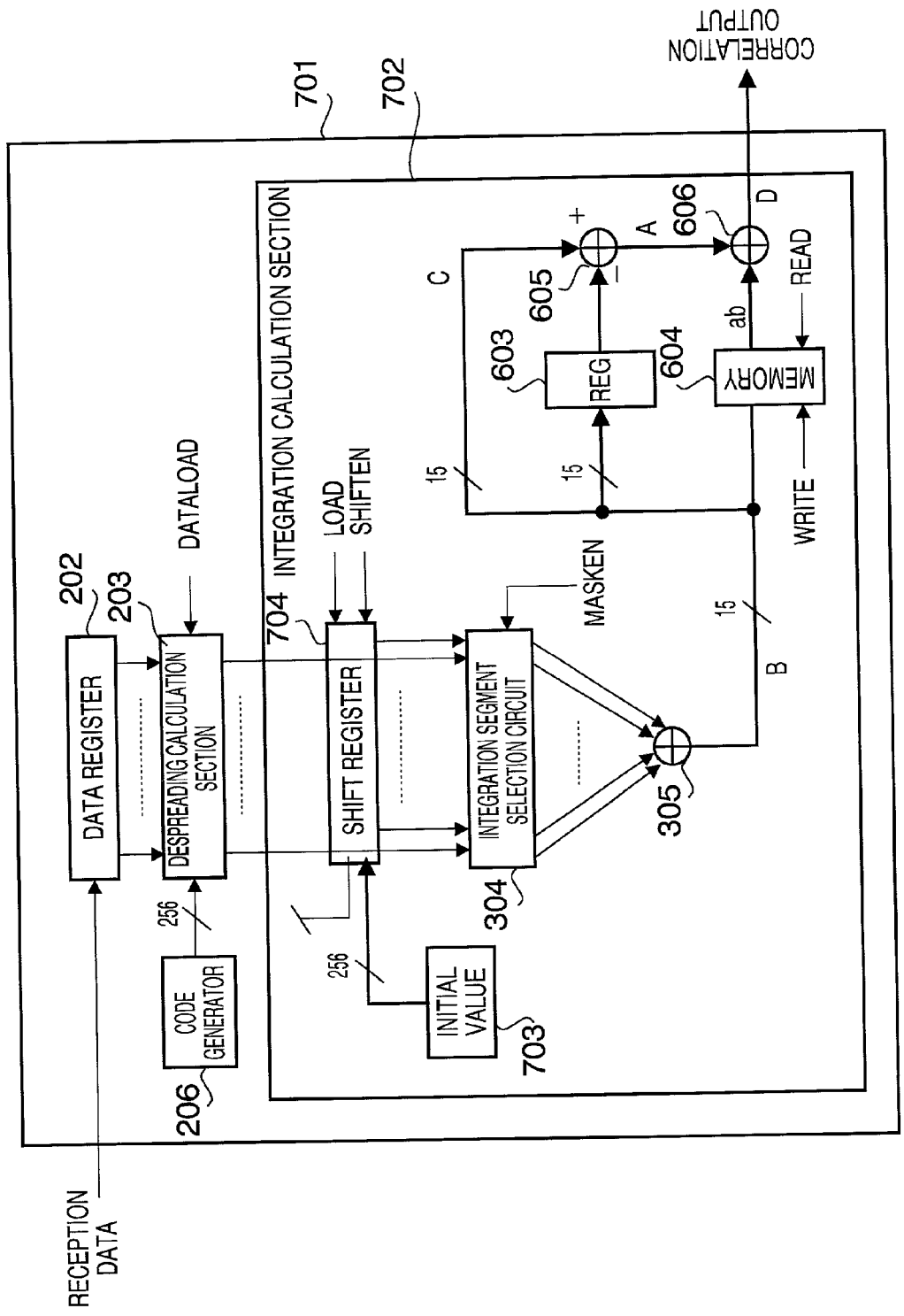
FIG. 17 is a block diagram of a matched filter according to Embodiment 4 of the present invention.

FIG. 17 is a block diagram showing a configuration of another example of a matched filter of the present invention.

The function of the matched filter of this embodiment is the same as that of the matched filter in FIG. 15. That is, the matched filter uses the integration segment selection circuit on a time-division basis and outputs a correlation value every two clocks.

However, as opposed to the embodiment in FIG. 15 which controls an integration segment of integration segment selection circuit 304 using decoder 303, this embodiment controls the integration segment of integration segment selection circuit 304 using shift register 704. This simplifies the circuit configuration.

Shift register 704 is given an initial value signal generated by initial value generator 703, a LOAD signal and SHIFTEN signal.

More specific operations of initial value generator 703 and shift register 704 will be explained using FIG. 18.

Data register 202 is always fed reception data serially.

First, a DATALOAD signal is validated at time T1, and the data retained in data register 202 is taken into despreading calculation section 203 at time T2 synchronized with the clock signal.

At time T2, a spreading code to despread the reception symbol to be calculated with a propagation delay of "0" is stored in despreading calculation section 203, a despreading calculation is performed and the result is retained until time T4.

At time T1, the LOAD signal is validated. At time T2 synchronized with the clock signal, an initial value generated by initial value generator 703 is taken into shift register section 704.

At time T2, the SHIFTEN signal is invalidated. This causes the shift operation of shift register 704 to stop at time T3.

Likewise, at time T2, a MASKEN signal input to integration segment selection circuit 304 is invalidated. This causes the completely the same data that is output from despreading calculation section 203 to be output from integration segment selection circuit 304.

At time T3, the SHIFTEN signal is validated. At time T4 synchronized with the clock, the shift operation of the shift register is validated. In this way, a shift operation is implemented once every two clocks.

Thus, this embodiment uses a shift register circuit instead of a decoder circuit that controls the integration segment selection circuit, and can thereby simplify the control circuit of the integration segment selection circuit. The function of the matched filter implemented is the same as that of the matched filter in FIG. 15.

(Embodiment 7)

Figure 19:
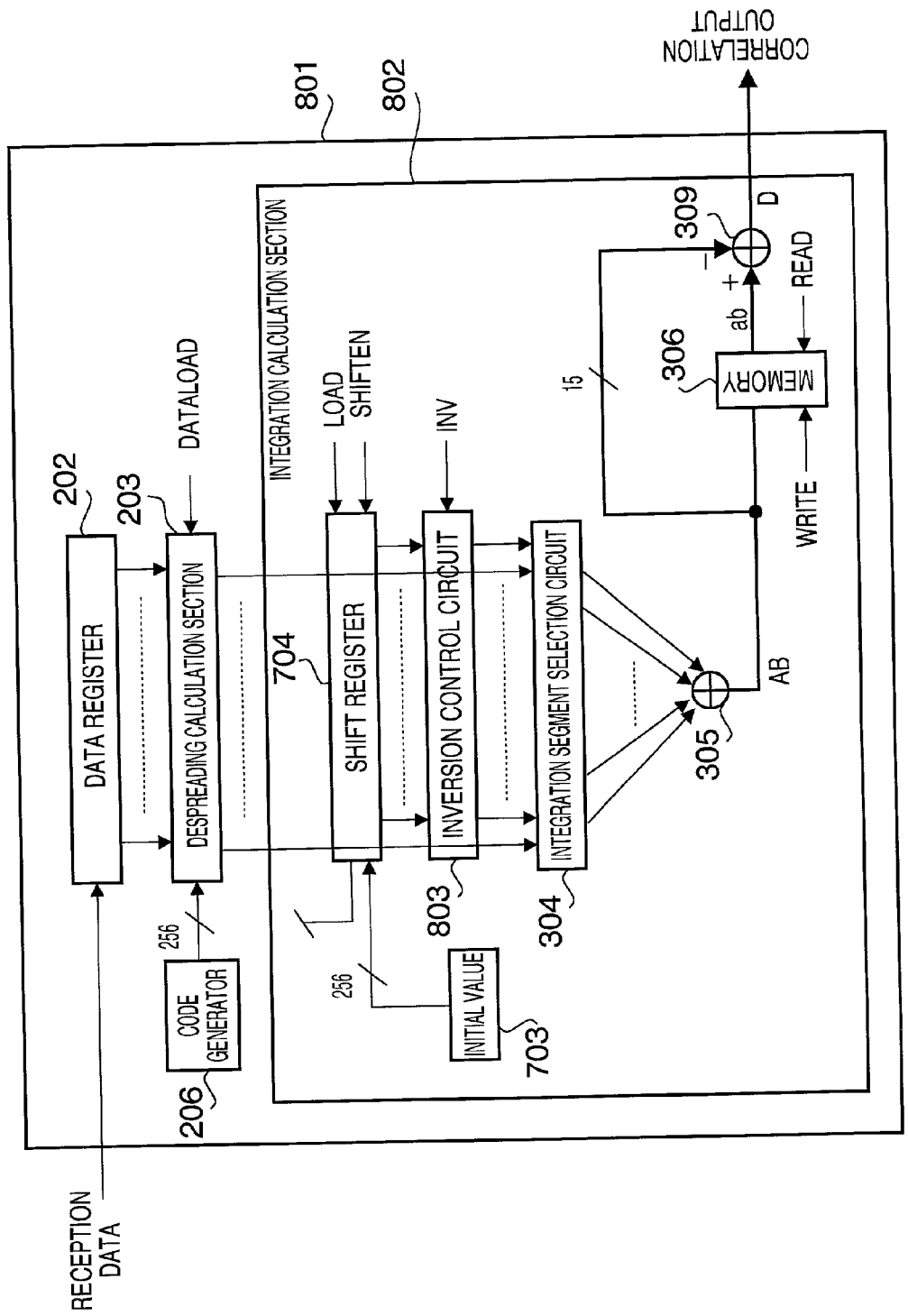
FIG. 19 is a block diagram of a matched filter according to Embodiment 5 of the present invention.

FIG. 19 is a block diagram showing another example of a matched filter of the present invention.

The function of the matched filter of this embodiment is the same as that of the matched filter in FIG. 17. However, since the matched filter in FIG. 17 subtracts integration result B specified by shift register 704 from integration value C of all bits subjected to despreading calculations to calculate integration result A in order to calculate correlation calculation result D, this matched filter has a rather complicated circuit configuration.

Thus, this embodiment provides inversion control circuit 803 that inverts the output of shift register 704 that selects an integration segment, partially inverts the output bit of shift register 704 and thereby calculates integration value A in an early stage. This makes it possible to reduce adders and memories, etc. considerably and simplify the circuit.

As is apparent from FIG. 19, provision of inversion control circuit 803 causes the final stage circuit that calculates correlation values to be constituted only by memory 306 and adder 309, which simplifies the circuit configuration.

The integration segment of integration segment selection circuit 304 is determined by the output of inversion control circuit 803. Output data of inversion control circuit 803 is obtained by inverting the output bit of shift register 704 based on an INV signal.

A more specific operation of inversion control circuit 803 will be explained using FIG. 20.

Data register 202 is always fed reception data serially.

First, a DATALOAD signal is validated at time T1, and the data retained in data register 202 is taken into despreading calculation section 203 at time T2 synchronized with the clock signal.

At time T2, a spreading code to despread the reception symbol to be calculated with a propagation delay of "0" is set in despreading calculation section 203, a despreading calculation is performed and the result is retained until time T4.

A LOAD signal is validated at time T1, and the output data of initial value generator 703 is taken into shift register section 704 at time T2 synchronized with the clock signal.

The SHIFTEN signal invalidated at time T2 invalidates the shift operation of shift register 704 at time T3.

At time T2, the level of the INV signal input to inversion control circuit 803 is fixed at a low level. This causes the data with all bits being "1" output from shift register 704 to be directly given to integration segment selection circuit 203. Integration segment selection circuit 203 outputs the same data bits as the output bits of all taps of despreading calculation section 203. Adder 305 adds up these data bits. This addition result is A2(0) in FIG. 20.

At time T3, the INV signal is fixed at a high level. This causes the all "1" signals output from shift register 704 to be inverted for all bits and become all "0" data bits. These all "0" signals are given to integration segment selection circuit 304 and to integration segment selection circuit 304 outputs data with the values of all data bits of despreading calculation section 203 masked and which are all at a low level (all "0" data). Adder 305 outputs "0" as B2(0) in FIG. 20.

At time T3, data B1(0) is read from an address specified by an ADDRESS signal of memory 306.

As a result, adder 309 outputs correlation calculation result D2(0) which is a sum of A2(0) and B(0).

Figure 18:
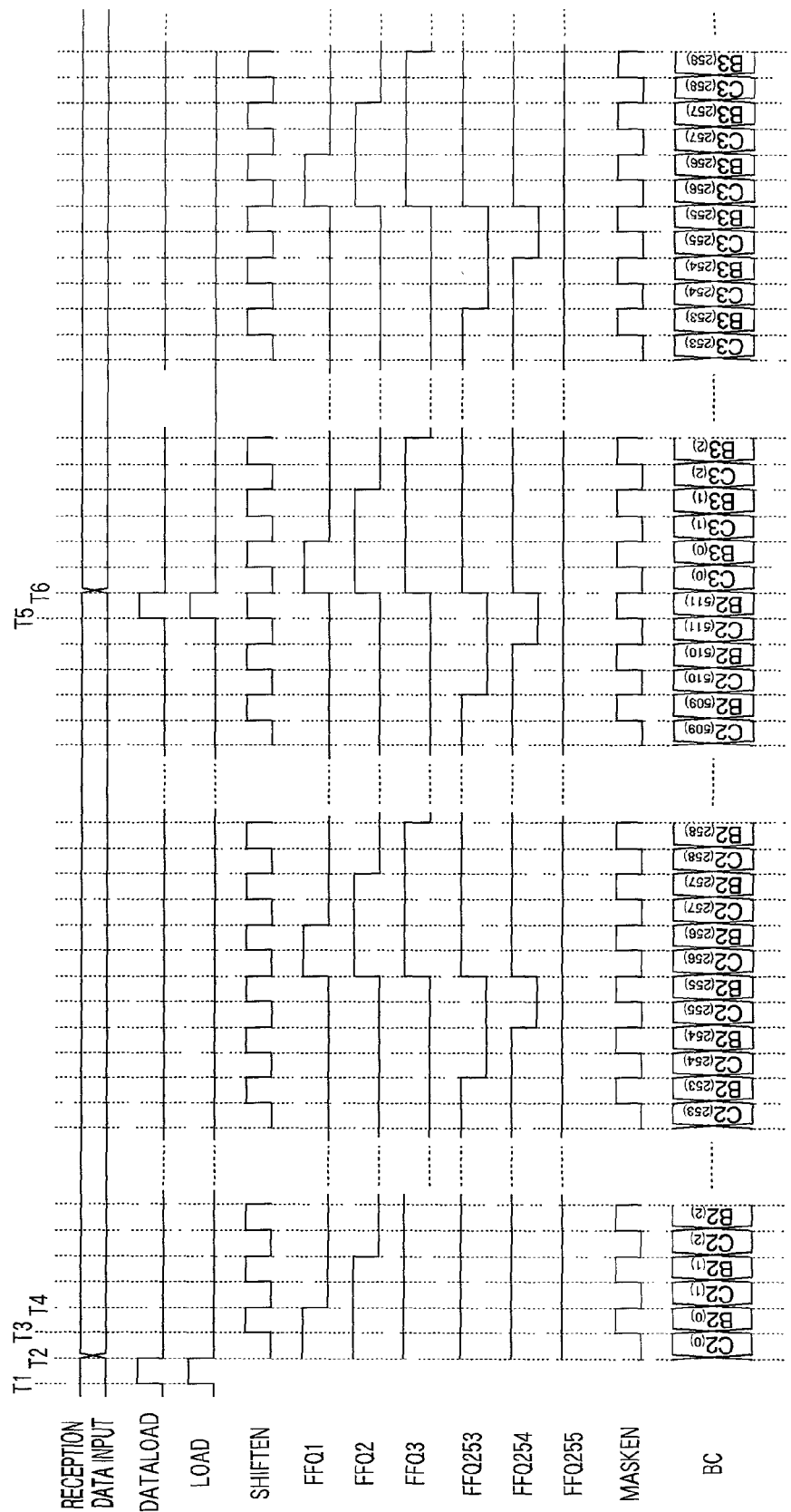
FIG. 18 is a timing chart showing an operation of the matched filter in FIG. 17.

Then, at time T4 in FIG. 18, data B2(0) is written at the same address of memory 306.

The calculation contents from time T4 onward are repetitions of the above-described contents.

Embodiment 5 calculates integration result A by subtracting integration result B specified by shift register 704 from integration value C of the processing segment subjected to a despreading calculation to obtain correlation calculation result D. In contrast to this, this embodiment inverts the output of shift register 704 that selects an integration segment and can thereby calculate integration value A, too.

Figure 20:
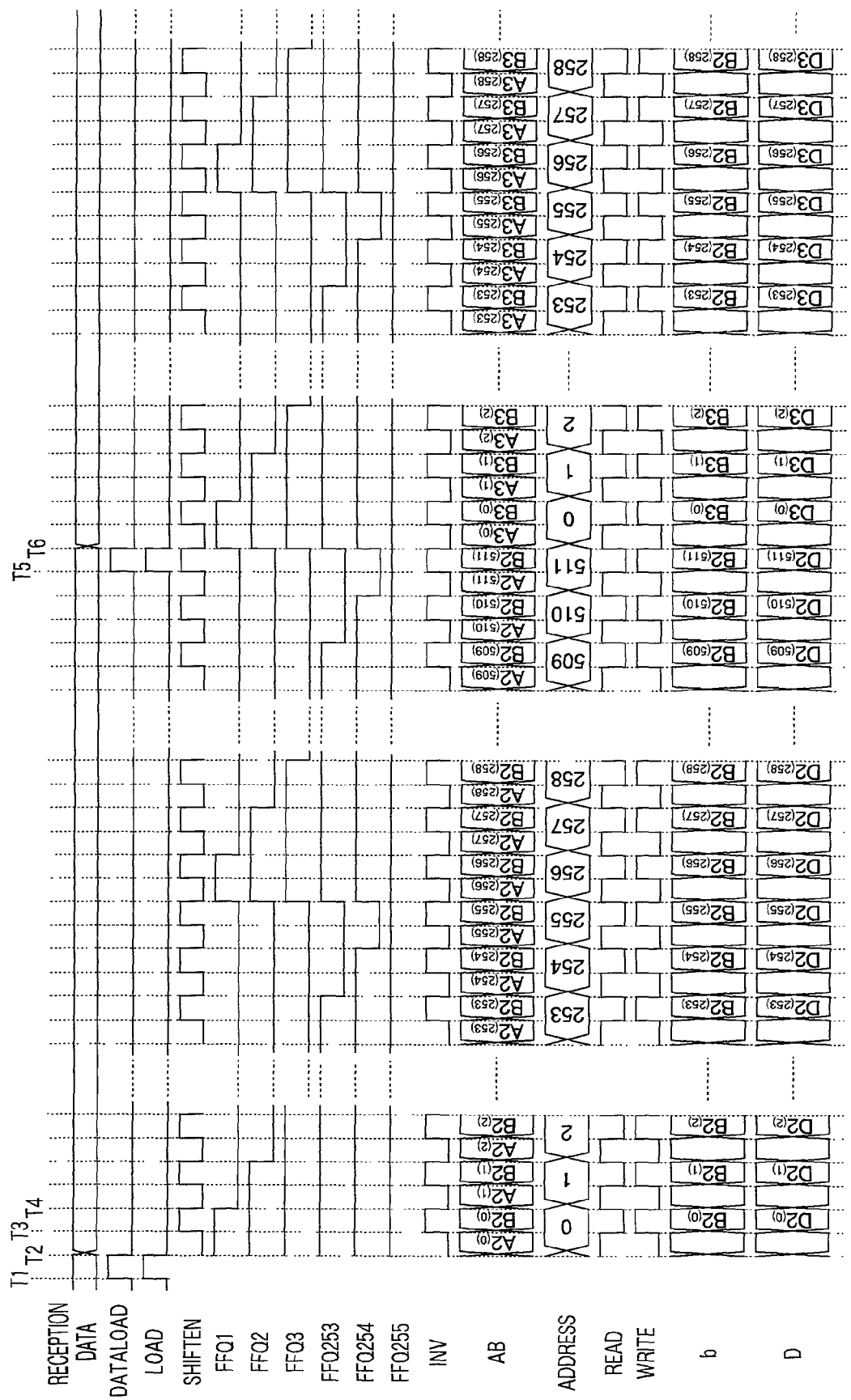
FIG. 20 is a timing chart showing an operation of the matched filter in FIG. 19.
Figure 21:
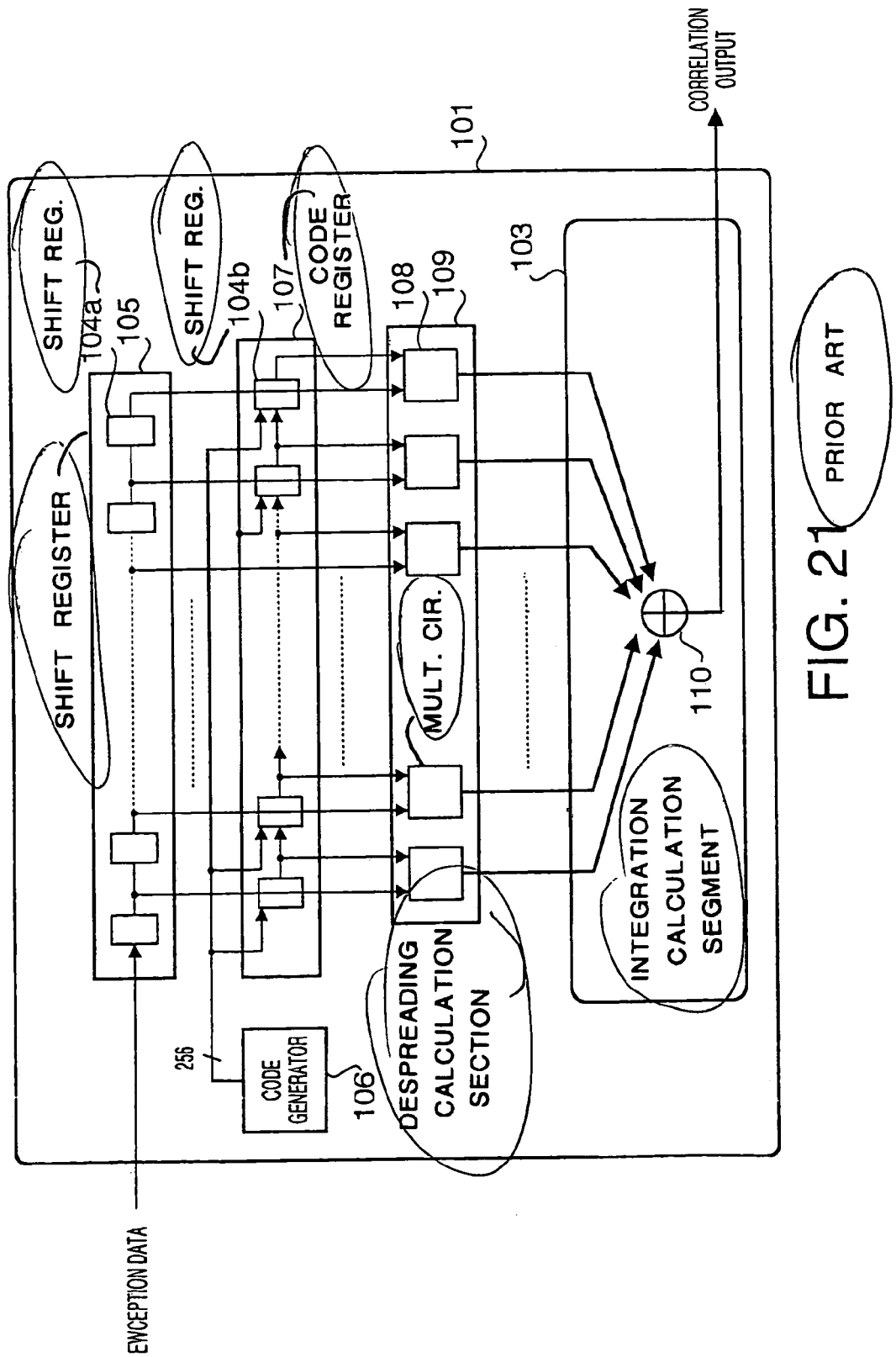
FIG. 21 is a block diagram showing a basic configuration of a conventional matched filter.
Figure 22A:
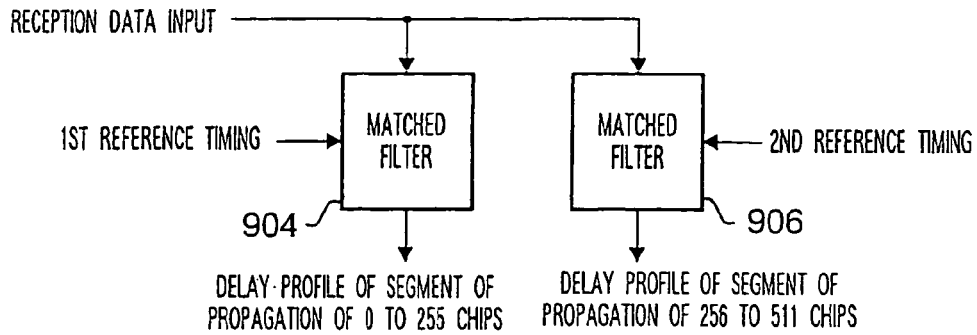
FIG. 22A is a block diagram showing a conventional configuration for carrying out correlation detection using two matched filters.
Figure 22B:
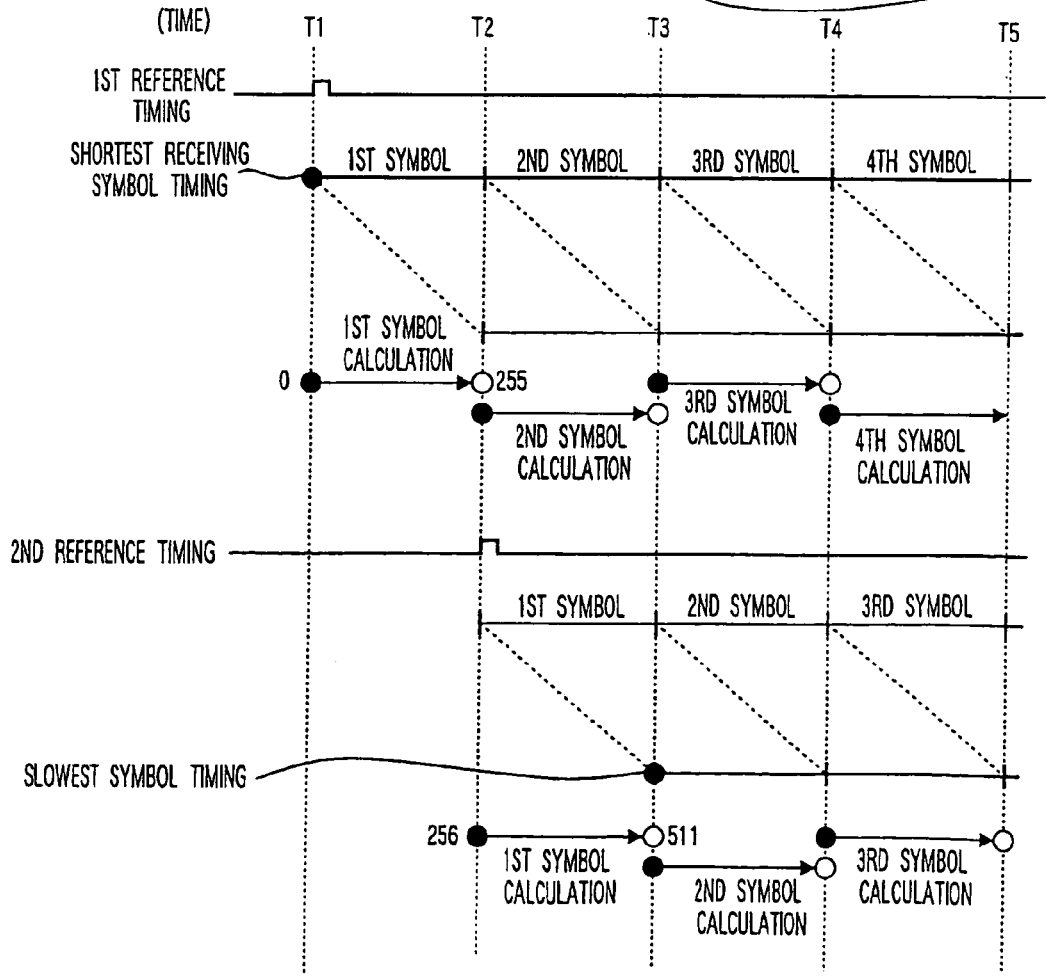
FIG. 22B is a timing chart illustrating an outline of an operation of the conventional configuration shown in FIG. 22A.

In FIG. 20, DECDIV1 to DECDIV255 change periodically with patterns shown in FIG. 20 based on DIV.

As shown above, this embodiment can reduce the number of adders and storage circuits by providing an inversion control circuit that controls inversion/non-inversion of output of the shift register that controls the integration segment selection circuit.

The present invention has been explained so far based on various embodiments. The foregoing explanations assume that the present invention is mainly used for a CDMA communication base station, but the present invention is not limited to this. For example, the present invention is also easily applicable, for example, to a case where a correlation of a data string with a plurality of different types of code is detected on the mobile station side.

As explained above, the present invention can carry out a data-fixed/code scan type correlation calculation, and therefore can speed up delay profile calculations more easily than prior arts. That is, the present invention eliminates constraints associated with the data input speed and allows calculation processing to be carried out 100% with the maximum processing performance of hardware that constitutes the matched filter.

As a result, the present invention can realize predetermined calculations with a matched filter of a smaller circuit scale. This allows a base station to easily extend the radius of a cell and a mobile station (cellular phone) to carry out delay profile calculation processing on a time-division basis under different conditions. The present invention also allows a single matched filter to cover a propagation delay of 1 symbol or more. The present invention suppresses the scale of the circuit and can thereby reduce the space, thus making it possible to reduce the size of the LSI, hence the size of the system.

This application is based on the Japanese Patent Application No. 2000-099306 filed on Mar. 31, 2000, entire content of which is expressly incorporated by reference herein.

INDUSTRIAL APPLICABILITY

The present invention is applicable to a correlation detector (matched filter) in a CDMA receiver.

What is claimed is:

1. A correlation detection method capable of creating a delay profile of a reception signal with a delay equivalent to a maximum of X chips, where X is a natural number, the method comprising:

extracting and fixing a first 1-symbol equivalent data from the data string of said reception signal;

continuously generating spreading codes with a delay increment of 1-chip by changing an amount of phase shift of the spreading codes between 0 chip and X chips, multiplying the first 1-symbol equivalent data by the spreading codes generated to obtain despreading results, integrating with respect to said despreading results while changing integration segments in association with virtual delimiters of the reception signal symbols which are uniquely determined in accordance with the phase shift amount of said spreading codes and storing the integration values;

further extracting and fixing a second 1-symbol equivalent data adjacent to the first fixed 1-symbol equivalent data and performing the continuous generating of spreading codes;

adding integration values corresponding to the same phase shift amount of the spreading codes obtained by the continuously generating spreading codes and by the further extracting and fixing, which is assumed to be the integration values with respect to the same symbol when virtual delimiters of said reception signal symbols are considered and calculating a correlation value on one symbol; and comparing calculated symbol-unit correlation values and detecting an amount of actual delay of said reception signal based upon a detected maximum correlation value.

2. The correlation detection method according to claim 1, further comprising creating a delay profile of a reception signal with a delay longer than a 1-symbol equivalent time by extracting and fixing, continuously generating, further extracting and fixing, adding and comparing steps using one matched filter.

3. A correlation detection method comprising:
- temporarily storing input data, fixing the data and despreading the fixed data while shifting a phase of a spreading code;
- integrating the despreading result with respect to a first-half symbol segment located before a uniquely determined symbol delimiter according to a phase shift amount of said spreading code and a last-half symbol segment located after the symbol delimiter; and
- adding an integration result of the first-half symbol segment to an integration result stored as a result of a previous integrating on the part of a symbol including the first-half symbol segment that corresponds to a same chase shift amount of the spreading code, while temporarily storing an integration result of said last-half symbol segment and adding the stored integration result to the integration result of a next execution of the integrating on the part of a symbol including the last half symbol segment that corresponds to a same phase shift amount of the spreading code, and thereby detecting a symbol-unit correlation.

4. The correlation detection method according to claim 3, further comprising comparing symbol-unit correlation values and detecting an amount of actual delay of said input data based on a maximum detected correlation value.

5. The correlation detection method according to claim 3, wherein serial data with two or more alternately positioned types of signals for one chip after another and multiplexed is used as said input data and data processing timing is controlled according to a level of multiplexing and the temporarily storing, integrating, adding and comparing are carried out only on the signals subject to correlation detection of said two or more types of signals.

6. A matched filter comprising:
- a temporary storage circuit that stores input data;
- a spreading code generator that continuously generates spreading codes with a phase that is shifted one chip at a time;
- a despreading calculation circuit that multiplies said input data stored in said temporary storage circuit by said spreading codes and generates despreading results;
- an integration circuit that integrates a despreading result with respect to a first-half symbol segment located before a uniquely determined symbol delimiter based upon a phase shift amount of said spreading code and a despreading result with respect to a last-half symbol segment located after the symbol delimiter;
- a storage circuit that temporarily stores the integration result of said last-half symbol segment; and
- a calculation circuit that adds an integration result with respect to said first-half symbol segment to the integration result stored in said storage circuit as a result of a previous processing in said despreading calculation circuit and said integration circuit on part of a symbol including said first half symbol segment that corresponds to a same phase shift amount of said spreading code, and outputs a correlation value on one symbol.

7. The matched filter according to claim 6, wherein said integration circuit obtains the integration result of said first-half segment by subtracting the integration result of said last-half segment from an integration result obtained by performing an integration calculation on all output bits of said despreading calculation circuit.

8. A CDMA reception apparatus comprising the matched filter according to claim 6 that performs synchronization acquisition processing or synchronization follow-up processing based on a correlation value of said matched filter.

9. A mobile communication base station apparatus that acquires synchronization of a spread spectrum modulated signal using the matched filter according to claim 6 and carries out communication control based on a synchronization timing acquired by said synchronization.

10. A mobile communication terminal apparatus that acquires synchronization of a spread spectrum modulated signal using the matched filter according to claim 6 and carries out communication control based on a synchronization timing acquired by said synchronization.

11. A matched filter comprising:
- a temporary storage circuit that stores input data;
- a spreading code generator that continuously generates spreading codes with a phase that is shifted one chip at a time;
- a despreading calculation circuit that multiplies said input data stored in said temporary storage circuit by said spreading codes;
- an addition calculation circuit that adds data bits sequentially output from said despreading calculation circuit starting from a least significant bit or a most significant bit and outputs a plurality of resulting addition values in parallel;
- a selector that selects said plurality of addition values output from said addition calculation circuit;
- a first calculation circuit that calculates an integration value of the despreading result with respect to a first-half symbol segment located before a symbol delimiter uniquely determined based on a phase shift amount of said spreading code by subtracting the addition values selected by said selector from an integration result obtained by an integration with respect to all output bits of said despreading calculation circuit; and
- a second calculation circuit that adds said integration value with respect to said first-half symbol segment to an integration value that is stored as a result of a previous processing in said first calculation circuit on part of a symbol that includes said first half symbol segment and that corresponds to the phase shift amount of the spreading code symbol acquired and stored as a result of the same and outputs a correlation value on one symbol.

12. A matched filter that extracts and fixes data of a predetermined width from serial data with two or more alternately positioned types of signals for one chip after another and multiplexed, and despreads the fixed data by continuously multiplying the fixed data by spreading codes with a shift amount that changes from one chip after another to calculate a correlation value, the filter comprising:
- a temporary storage circuit that stores data with said predetermined width;
- a spreading code generator that continuously generates spreading codes having a phase shift of one chip at a time;
- a despreading calculation circuit that multiplies said input data stored in said temporary storage circuit by said spreading codes;
- an integration circuit that controls data processing timing according to a level of multiplexing of said fixed data and applies signal processing only to signals subject to correlation detection of said two or more types of signals, and obtains integration values by integrating a despreading result with respect to a first-half symbol segment located before a symbol delimiter uniquely determined according to the phase shift amount of said spreading code on the signals subject to the correlation detection and a despreading result with respect to a last-half symbol segment located after the symbol delimiter;

a storage circuit that temporarily stores an integration result of said last-half symbol segment; and a calculation circuit that adds an integration result of said first-half symbol segment to an integration result that is stored in said storage circuit as a result of a previous processing in the calculation circuit on part of a symbol including said first half symbol segment and that corresponds to a same phase shift amount of said spreading code and outputs a correlation value on one symbol.

13. The matched filter according to claim 12, wherein said integration circuit controls a range of integration using a shift register.

14. The matched filter according to claim 13, further comprising an inversion/non-inversion control circuit that controls inversion/non-inversion of output bits of said shift register.

* * * * *